(12) United States Patent
Lavaud

(10) Patent No.: US 11,350,104 B2
(45) Date of Patent: May 31, 2022

(54) METHOD FOR PROCESSING A SET OF IMAGES OF A VIDEO SEQUENCE

(71) Applicant: ATEME, Velizy Villacoublay (FR)

(72) Inventor: Anne-Lyse Lavaud, Malakoff (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/913,329

(22) Filed: Jun. 26, 2020

(65) Prior Publication Data
US 2020/0413066 A1    Dec. 31, 2020

(30) Foreign Application Priority Data
Jun. 26, 2019 (FR) ...................................... 19 06930

(51) Int. Cl.
*H04N 19/142* (2014.01)
*H04N 19/115* (2014.01)
*H04N 19/159* (2014.01)

(52) U.S. Cl.
CPC ......... *H04N 19/142* (2014.11); *H04N 19/115* (2014.11); *H04N 19/159* (2014.11)

(58) Field of Classification Search
CPC ... H04N 19/142; H04N 19/115; H04N 19/159
USPC .................................................. 375/240.02
See application file for complete search history.

(56) References Cited

U.S. PATENT DOCUMENTS

| 2016/0205402 A1* | 7/2016 | Eckart | H04N 19/14 |
| | | | 375/240.07 |
| 2018/0310075 A1 | 10/2018 | Casal Martin et al. | |
| 2019/0253471 A1* | 8/2019 | Ponekker | H04L 65/605 |
| 2020/0351504 A1* | 11/2020 | Sen | H04N 19/115 |

FOREIGN PATENT DOCUMENTS

EP          3393129 A1     10/2018

OTHER PUBLICATIONS

FR Search Report, dated Jan. 29, 2020, from corresponding FR application No. 1906930.
Adzic et al., "Optimizing Video Encoding for Adaptive Streaming over Http", IEEE Transactions on Consumer Electronics, 2012, pp. 397-403, vol. 58, No. 2, XP055139593.
Cablelabs, "Encoder Boundary Point Specification—OC-SP-EBP-I01-130118", OpenCable (TM) Specifications, 2013, XP055138397, URL: <http://www.cablelabs.com/wp-content/uploads/specdocs/OC-SP-EBP-I01-130118.pdf>.

(Continued)

*Primary Examiner* — Allen C Wong
(74) *Attorney, Agent, or Firm* — Nixon & Vanderhye

(57) ABSTRACT

Disclosed is a method, implemented by computer, for processing a video sequence including a set of images, which method includes: obtaining information indicating at least one image in the set of images to be encoded using a spatial correlation-based predictive coding mode, determining consecutive subsets of images in the set of images, and encoding the video sequence on the basis of the determined consecutive subsets of images, wherein the respective sizes of at least some of the subsets of images are dependent on the at least one image to be encoded using the spatial correlation-based predictive coding mode.

20 Claims, 8 Drawing Sheets

(56) References Cited

OTHER PUBLICATIONS

Pantos, "HTTP Live Streaming", 2017, <http://tools.ietf.org/html/draft-pantos-http-live -streaming-06>.

Joint Technical Committee ISO/IEC JTC 1, "Dynamic adaptive streaming over HTTP (DASH)", International Organization for Standardization (2012)ISO/IEC DIS 23009-1.2, second edition May 15, 2014.

Sullivan et al., "Overview of the High Efficiency Video Coding (HEVC) Standard", IEEE Transactions on Circuits and Systems for Video Technology, 2012, pp. 1649-1668, vol. 22, No. 12.

Fisher, "An overview of HTTP Adaptive Streaming protocols for TV everywhere delivery", RGB Networks, 2014.

Tizon et al., "Streaming video adaplalif avec un modèle de distorsion récursif", GRETSI, 2009, English Abstract.

Adams et al., "Optimizing Fairness of HTTP Adaptive Streaming in Cable Networks", 2012.

Unified Streaming, "Recommended VOD settings", 2020, http://docs.unified-streaming.com/documentation/vod/recommended-settings.html.

Lederer, "Optimal Adaptive Streaming Formats MPEG-DASH & HLS Segment Length", 2015, https://bitmovin.com/mpeg-dash-hls-segment-length/.

\* cited by examiner

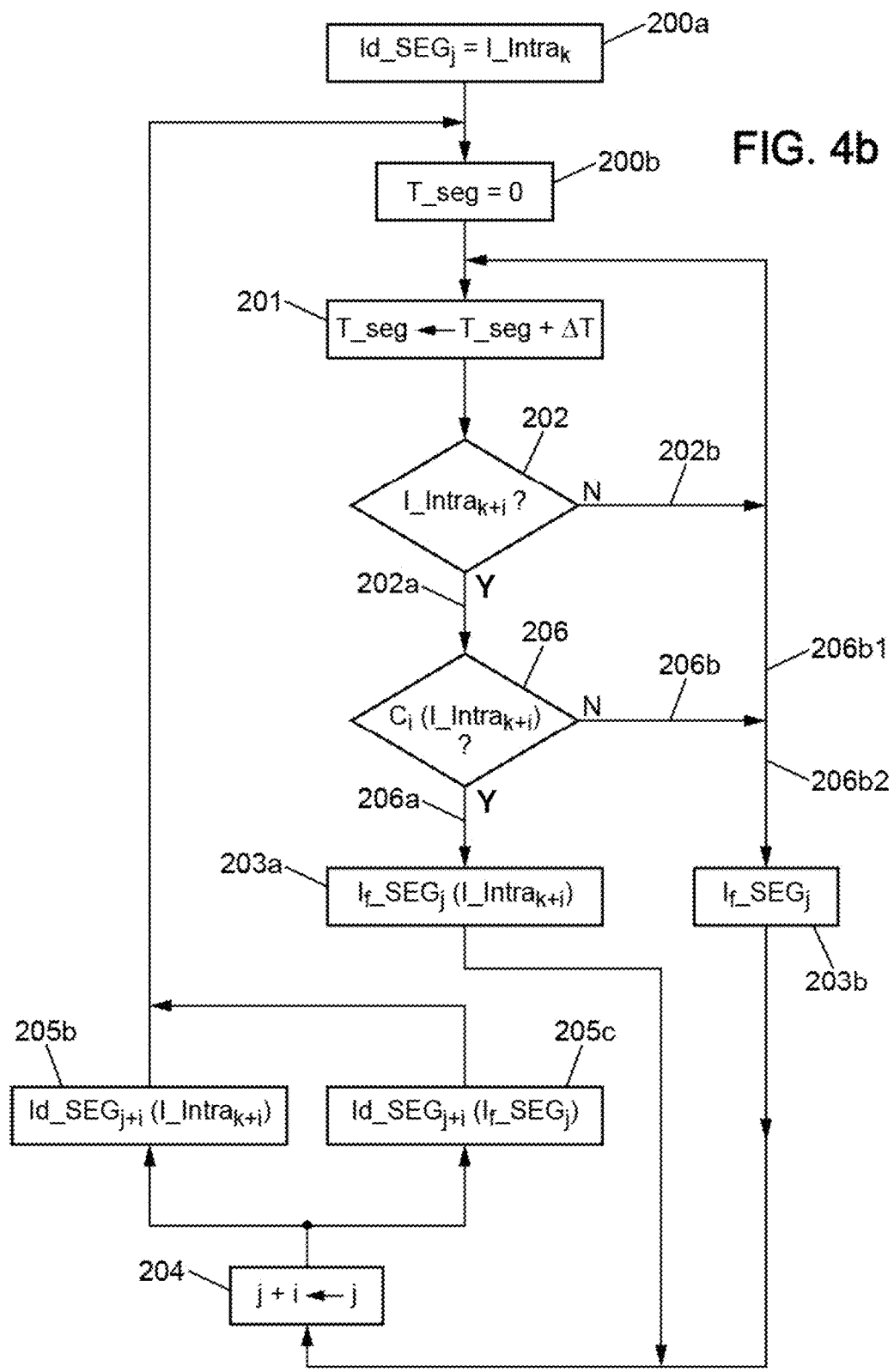

METHOD FOR PROCESSING A SET OF IMAGES OF A VIDEO SEQUENCE

CROSS-REFERENCE TO RELATED APPLICATIONS

This application claims priority benefit under 35 U.S.C. § 119(d) from French Patent Application No. FR1906930, filed Jun. 26, 2019, the disclosure of which is incorporated by reference herein in its entirety.

BACKGROUND OF THE INVENTION

Field of the Invention

The present subject disclosure relates to a method for processing a video sequence and to a device for implementing this method.

Description of the Related Art

The dynamic (live) or on-demand distribution or broadcasting of multimedia content transported by video streams (also called video streaming) has over the last few years become an essential practice. Increasing consumer demand and the increase in the resolution of video data for improving customer experience require regular optimizations, be this in terms of methods or in terms of infrastructures for implementing them.

In the video field, and more particularly the video streaming field, a video sequence to be transmitted may be encoded by dividing the video sequence into chunks, sometimes called chunking, prior to encoding the chunks.

The use of chunk-based transportation in modern systems takes into account constraints that are intended to ensure that the change in profile from one level of quality to another does not have a visual impact that could be inconvenient to a user.

These constraints may lead to losses of performance in the video encoding, in particular from the viewpoint of the overall encoding efficiency of a video sequence.

SUMMARY

The present subject disclosure aims to improve the situation.

SUMMARY OF THE INVENTION

To this end, according to a first aspect, what is proposed is a method for processing a video sequence containing a set of images. The proposed method comprises: obtaining information indicating at least one image in the set of images to be encoded using a spatial correlation-based predictive coding mode; determining consecutive subsets of images in the set of images; and encoding the video sequence on the basis of the determined consecutive subsets of images; wherein the respective sizes of at least some of the subsets of images are dependent on the at least one image to be encoded using the spatial correlation-based predictive coding mode.

The proposed method advantageously makes it possible to define, based on a video sequence comprising a set of images, chunks of variable sizes, in that the size of a chunk is able to be determined independently of the size of another chunk defined for one and the same video sequence. The use of dividing a video sequence into sequences, for example in order to distribute the sequence in dynamic mode (live mode), or in static mode (video on demand mode), for example on an over the top network, is thus made more flexible, by making it possible to break free from at least some of the constraints that are typically applied in conventional systems, and in particular the constraint imposing fixed-size chunks.

Advantageously, the proposed method takes advantage of the information according to which one or more images of the set of images of the video chunk should be encoded using a spatial correlation-based predictive coding mode, such as for example an intra coding mode. Each of these images may be used to define the start of a chunk, thus avoiding having to select, in the set of images, images that are not initially identified as having to be encoded using a spatial correlation-based predictive coding mode, and that become so since they are intended to be the starting image of a chunk, and thus to increase the number of images that have to be encoded using a spatial correlation-based predictive coding mode for the video chunk, to the detriment of the encoding efficiency. Therefore, using the proposed method during adaptive streaming of a video sequence or of a video stream broadcast in dynamic mode makes it possible for example to vary the size of the chunks on the basis of images forming the sequence or the video stream, in order to improve the overall encoding efficiency on the basis of information specific to the video sequence or to the video stream.

Advantageously, the proposed method does not depend on the transport protocol that is used, and may be implemented using any transport protocol appropriate for transporting encoded video sequence chunks.

In addition, the proposed method is particularly well-suited, but not exclusively, to encoding or compressing a video sequence or a video stream in accordance with a scheme of H.264, H.265, H.262, MPEG-2, AVC, or HEVC type. It is however also suitable for encoding images of a set of images of a video sequence in accordance with any video encoding scheme.

In one or more embodiments, obtaining information indicating at least one image in the set of images to be encoded using a spatial correlation-based predictive coding mode may comprise determining, in the set of images, at least one image to be encoded using a spatial correlation-based predictive coding mode. This determination may be performed for example by analysing the set of images of the video sequence in order to determine therein the image or images to be encoded using a spatial correlation-based predictive coding mode, for example from the fact that these images correspond to respective scene changes in the video sequence. In addition, obtaining information indicating at least one image in the set of images to be encoded using a spatial correlation-based predictive coding mode may comprise obtaining information indicating that a chunk creation request (sometimes called external order) has been received for one or more images of the set of images.

Thus, in one or more embodiments, the at least one image to be encoded using a spatial correlation-based predictive coding mode may correspond to a scene change in the video sequence or to a sub-chunk creation request.

In one or more embodiments, determining at least one subset may comprise determining a starting image of the subset from among the image/images to be encoded using the spatial correlation-based predictive coding mode. One or more subsets (or chunks) may thus be defined by selecting an image to be encoded using the spatial correlation-based predictive coding mode as subset starting image. The end image of such a subset may then be selected on the basis of the starting image of the subset immediately following the subset currently being defined, for example by choosing the image immediately preceding the starting image of the subset immediately following the subset currently being defined.

In one or more embodiments, the subsets may be defined such that each image of the sequence belongs to at least one subset of images determined from the sequence.

In one or more embodiments, at least one image of the plurality of images to be encoded using a spatial correlation-based predictive coding mode is determined on the basis of a correspondence with a scene change in the video sequence.

In one or more embodiments, at least one image of the plurality of images to be encoded using a spatial correlation-based predictive coding mode is determined on the basis of a correspondence with an external order. It is thus advantageously possible to comply with external broadcast constraints required by a user. These constraints may be of different kinds, such as the insertion of an advertisement into the video sequence, trailers, information or any other elements intended to be broadcast.

In one or more embodiments, the spatial correlation-based predictive coding mode is an intra mode.

Thus, in one or more embodiments, one or more of the chunks that are formed may start with an intra image corresponding to a scene change or an external order. As discussed above, one advantage is the saving in terms of the number of intra images, given that these images contribute to the high cost of the bitrate in a video sequence. In so far as good coding efficiency of the chunk requires coding each scene change of the chunk using an intra image, positioning a maximum number of images determined as being scene change intra images as respective first chunk images advantageously makes it possible to reduce the number of intra images imposed by the chunking process for chunking the video sequence.

In one or more embodiments, determining at least one subset may comprise: determining a starting image of the subset in the set of images; determining, from among the images positioned in the sequence starting from the starting image of the subset, a starting image of the subset immediately following, in a string of the consecutive subsets of images, the subset on the basis of an image from among the plurality of images to be encoded using the spatial correlation-based predictive coding mode; determining, from among the images positioned in the sequence starting from the starting image of the subset, an end image of the subset on the basis of the starting image of the following subset; determining the subset as comprising the starting image of the subset, the end image of the subset and the images of the set of images that are positioned between the starting image of the subset and the end image of the subset in the sequence.

A scheme for chunking a set of images corresponding to a video sequence may thus define a chunk by determining, in the set of images, a starting image of the chunk currently being defined (for example by selecting an image previously identified as having to be encoded using an intra mode). Once the chunk starting image has been determined, the set of images may be run through starting from this chunk image in order to determine therein a starting image of the chunk following (in a string of consecutive chunks, for example defined sequentially as the video sequence is chunked) the chunk currently being defined. The starting image of the following chunk may be determined in various ways depending on the embodiment, for example by selecting an image previously identified as having to be encoded using an intra mode. According to another example, the starting image of the following chunk may be determined so as to comply with a constraint, for example the maximum size of the chunks to be defined. The end image of the chunk currently being defined may then be determined on the basis of the starting image of the following chunk, and the chunk currently being defined as being the chunk comprising its starting image, its end image and the images positioned between the starting image and the end image in the video sequence.

In one or more embodiments, determining at least one subset may use a criterion relating to the size of the at least one subset. For example, the criterion may be a minimum size criterion and/or a maximum size criterion. This advantageously makes it possible to take into account a minimum size and/or a maximum size when defining the chunks on the basis of the images determined as having to be encoded using a spatial correlation-based predictive coding mode.

For example, in one or more embodiments, determining at least one subset may comprise: determining a starting image of the subset in the set of images; determining, from among the images positioned in the sequence starting from the starting image of the subset, a first candidate image in the plurality of images to be encoded using a spatial correlation-based predictive coding mode; determining a distance between the starting image of the subset and the first candidate image; comparing the distance with a threshold corresponding to a minimum size criterion or to a maximum size criterion; determining, in the set of images, an end image of the subset on the basis of the comparison with the threshold.

In one or more embodiments, the proposed method may comprise, when the threshold corresponds to a minimum size: when the distance is less than the threshold, determining, from among the images positioned in the sequence starting from the first candidate image, a second candidate image in the plurality of images to be encoded using a spatial correlation-based predictive coding mode; determining the subset using the second candidate image.

In one or more embodiments, the proposed method may comprise, when the threshold corresponds to a maximum size: when the distance is greater than the threshold, determining, from among the images positioned in the sequence starting from the starting image of the subset, an end image of the subset on the basis of a predetermined sub-chunk size.

Depending on the embodiment, the size of a chunk may be expressed as a duration, taking into account the image frequency (sometimes also called frame rate), thereby making it possible to associate a duration with an image of the video sequence. A size expressed as a number of images may thus be expressed by the duration to which this number of images corresponds, taking into account the image frequency. Thus, in one or more embodiments, the respective sizes of the subsets may be defined on the basis of duration constraints. It is then advantageously possible to encode a chunk according to a size defined as being the most appropriate for this chunk.

The constraints may thus advantageously be defined upstream by the user in order to adapt to the encoding conditions or network infrastructure conditions.

In one or more embodiments, the proposed method may furthermore comprise: determining, in the set of images, a plurality of reference images whose positions in the sequence are separated in pairs by a predetermined distance; determining, in the set of images, for at least one subset, a starting image of the subset; determining a reference image positioned in the sequence starting from the starting image of the subset; determining, in the plurality of images to be encoded using a spatial correlation-based predictive coding mode, from among the images positioned in the sequence around the reference image and at a distance less than a predetermined variation threshold, a starting image of the subset immediately following the subset in a string of consecutive subsets of images; determining, from among the images positioned in the sequence starting from the starting image of the subset, an end image of the subset on the basis of the starting image of the following subset.

In one or more embodiments, the external order takes priority over one or more or even all of the other constraints that are used. Advantageously, even in the presence of duration constraints, a user is thus able to impose the insertion of another video sequence without a delay. The inserted video sequences may be for example a targeted or non-targeted advertisement or else informational messages that may take priority.

According to another aspect, what is proposed is a method for processing a video sequence containing a set of images, which method comprises: determining, in the set of images, a plurality of images to be encoded using a spatial correlation-based predictive coding mode; determining, in the set of images, consecutive subsets of images whose respective sizes are dependent on images to be encoded using the spatial correlation-based predictive coding mode; and encoding the video sequence on the basis of the determined consecutive subsets of images.

According to another aspect, what is proposed is a video sequence encoding device, comprising an input interface configured so as to receive a set of images of the video sequence; and an image encoding unit operationally coupled to the input interface and configured so as to process the video sequence.

According to another aspect, what is proposed is a computer program able to be loaded into a memory associated with a processor and comprising code portions for implementing the steps of the method.

According to another aspect, what is proposed is a dataset representing, for example through compression or encoding, a computer program.

Another aspect relates to a non-transient storage medium for storing a program able to be executed by a computer, comprising a dataset representing one or more programs, said one or more programs comprising instructions for, when said one or more programs are executed by a computer comprising a processing unit operationally coupled to memory means and to an input/output interface module, prompting the computer to encode a video sequence.

BRIEF DESCRIPTION OF THE DRAWINGS

Other features, details and advantages will become apparent on reading the detailed description below and on analysing the appended drawings, in which:

FIG. 4b illustrates an exemplary implementation of the proposed method according to one or more embodiments.

DESCRIPTION OF THE PREFERRED EMBODIMENTS

Figure 1:
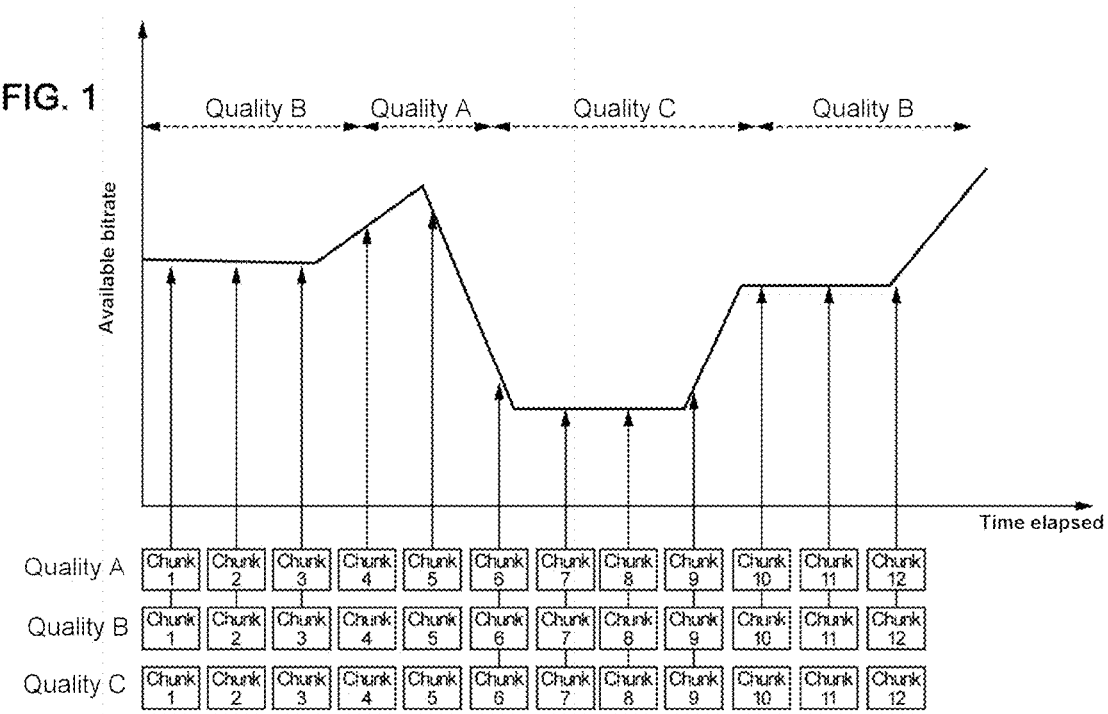
FIG. 1 shows an example of chunking according to one or more embodiments.

In the following detailed description of embodiments of the subject disclosure, numerous specific details are presented so as to provide a more complete understanding. Nevertheless, a person skilled in the art may be aware that embodiments may be implemented without these specific details. In other cases, well-known features are not described in detail so as to avoid needlessly complicating the description.

The present description refers to functions, engines, units, modules, platforms and illustrations of diagrams of the methods and devices according to one or more embodiments. Each of the functions, engines, modules, platforms, units and diagrams that are described may be implemented in the form of hardware, software (including in the form of embedded software (firmware) or middleware), microcode, or any combination thereof. In the case of an implementation in the form of software, the functions, engines, units, modules and/or illustrations of diagrams may be implemented by computer program instructions or software code that may be stored or transmitted on a computer-readable medium, including a non-transient medium, or a medium loaded to the memory of a generic or specific computer or any other programmable data-processing apparatus or deceive in order to produce a machine, such that the computer program instructions or the software code executed on the computer or the programmable data-processing apparatus or device form means for implementing these functions.

The embodiments of a computer-readable medium include, non-exhaustively, computer storage media and communication media, including any medium facilitating the transfer of a computer program from one location to another. "Computer storage medium/media" means any computer-accessible physical medium. Examples of computer storage media include, without limitation, flash memory disks or components or any other flash memory devices (for example USB keys, memory keys, memory sticks, disk keys), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor.

Furthermore, various forms of computer-readable media may transmit or carry instructions to a computer, such as a router, a gateway, a server, or any data transmission equipment, whether this involves wired transmission (via coaxial cable, optical fibre, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

In addition, the terms "in particular", "for example", "example", "typically" are used in the present description to denote examples or illustrations of non-limiting embodiments that do not necessarily correspond to preferred or advantageous embodiments with respect to other possible aspects or embodiments.

"Server" or "platform" in the present description means any (virtualized or non-virtualized) point of service or device performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A computer device may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols, and interoperate with larger networks. Various types of equipment may be used to make various architectures or various protocols interoperable. For example, a router may be used to provide a communication link or a data link between two LANs that would otherwise be separate and independent.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

The terms "application" or "application program" (AP) and their variants ("app", "web app", etc.) as used in the present description correspond to any tool that operates and is operated by way of a computer in order to provide or execute one or more function(s) or task(s) for a user or another application program. In order to interact with an application program and control it, a user interface may be provided on the equipment on which the application program is implemented. For example, a graphical user interface (or GUI) may be generated and displayed on a screen of the user equipment, or an audio user interface may be played back to the user using a speaker, a headset or an audio output.

The term "multimedia content" as used in the present description corresponds to any audio and/or video or audio-visual content.

In the present description, the terms "real-time" distribution, distribution "in linear mode", distribution "in linear TV mode", distribution "in dynamic mode" and "live" distribution or distribution "in live mode" are used interchangeably to denote the distribution in live mode or dynamic mode of multimedia content in a content distribution system to terminals, comprising in particular the distribution of the content as it is generated, as opposed to distributing content generated previously, upon an access request from a user (distribution upon an access request or "static" distribution or distribution in static mode), such as for example content recorded on a server and made available to users by a video on demand (VOD) service.

In the present description, the term "live content" refers to content, for example multimedia content, that is distributed, for example using an OTT distribution mode, in dynamic mode (as opposed to the static distribution mode). Live content will typically be generated by a television station, or by any type of television medium, and may also be distributed on a multimedia content broadcast network, in addition to being made available on content servers in an OTT distribution system.

In the present description, the terms "terminal", "user equipment", "reader", "reading device", "reading terminal" and "video reader" are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

In the present description, the term "duration" for an image of a sequence or of a video stream may denote the duration corresponding to an image for the image frequency (also called frame rate) of the video sequence. For example, the duration of an image of a video stream with an image frequency equal to 25 images per second will be equal to ½5 second, that is to say 40 ms, and the duration of an image of a video stream with an image frequency equal to 30 images per second will be equal to ⅓0 second, that is to say around 33.3 ms. The size of a chunk corresponding to a subset of images of the set of images of a video stream, expressed as a number of images, may be transposed into a duration equal to the duration of one image multiplied by the number of images.

The video data are generally subjected to source coding aimed at compressing them in order to limit the resources required to transmit them and/or to store them. There are numerous coding standards, such as H.264/AVC, H.265/HEVC and MPEG-2, that may be used for this purpose.

Consideration is given to a video stream comprising a set of images. In conventional coding schemes, the images of the video stream to be encoded are typically considered in an encoding sequence, and each one is divided into sets of pixels that are themselves also processed sequentially, for example starting at the top left and finishing at the bottom right of each image.

An image of the stream is thus encoded by dividing a matrix of pixels corresponding to the image into a plurality of sets, for example blocks of a fixed size of 16×16, 32×32 or 64×64, and by encoding these blocks of pixels in a given processing sequence. Certain standards, such as H.264/AVC, provide the option of breaking down the blocks of size 16×16 (then called macro-blocks) into sub-blocks, for example of size 8×8 or 4×4, in order to perform the encoding processing operations with greater granularity. Processing a block (or set) of pixels typically comprises predicting the pixels of the block, which may be performed using (previously coded) causal pixels that are present in the image currently being encoded (called "current image"), in which case reference is made to spatial correlation-based prediction, or "intra" prediction, and/or using pixels from previously coded images, in which case reference is made to temporal correlation-based prediction, or "inter" prediction.

Utilizing the spatial and temporal redundancies in this way makes it possible to avoid transmitting or storing the value of the pixels of each block (or set) of pixels, by representing at least some of the blocks through a pixel residual that represents the difference (or the distance) between the predicted values of the pixels of the block and the actual values of the pixels of the predicted block. The information on the pixel residuals is present in the data generated by the encoder after transformation (for example DCT transformation) and quantization in order to reduce the entropy of the data generated by the encoder.

An image of a video stream currently being processed is thus typically divided into blocks whose shape and size are determined on the basis in particular of the size of the matrix of pixels representing the image, for example in square blocks of 16×16 pixels. A set of blocks is thus formed, for which a processing sequence (also called "processing path") is defined. It is possible for example to process the blocks of the current image starting with the one located at the top left of the image, followed by the one immediately to the right of the previous one, until reaching the end of the first row of blocks so as to move to the leftmost block in the row immediately below, so as to end the processing with the lowest rightmost block of the image.

Consideration is thus given to a "current block", that is to say a block currently being processed in the current image. Processing the current block may comprise dividing the block into sub-blocks, in order to process the block with greater spatial granularity than that achieved with the block. Processing a block moreover comprises selecting a prediction mode for the block, which may be intra or inter, as explained above.

A video sequence comprising a set of images may thus be divided into consecutive chunks, each chunk corresponding to a subset of the set of images, in particular when the video sequence is distributed in encoded form in dynamic (live) mode or in static mode (for example in distribution mode upon demand from the user). The chunks of the sequence may be encoded sequentially, for example as they are distributed.

Each chunk that is transmitted, for example during video streaming, thus represents an encoded part of the video sequence or of the initial video stream for a given quality, and is able to be decoded independently of the other chunks of the video sequence. The phase of encoding the chunks prior to transmission aims to compress the data of the video sequence in order to limit the resources required to transmit it and/or to store it. This encoding phase also makes it possible to obtain a plurality of lower and higher quality/resolution profiles in one and the same video sequence. These profiles of the video sequence are then transmitted via the chunks, and make it possible to adapt the quality of the video sequence to the constraints of the client (bitrate, hardware resources of the viewing apparatus, etc.).

Using chunks makes it possible in particular to begin reading a video sequence the downloading of which has not ended, but also to switch to a different profile having a lower or higher quality, depending on the fluctuations in bandwidth experienced by the client when receiving the video stream. One example of adapting the video quality on the basis of the available bitrate is shown in FIG. 1. The majority of video stream transport protocols, such as HLS (Http Live Streaming) or DASH (Dynamic Adaptive Streaming over Http), use this principle of chunking.

FIG. 1 shows an example of chunking in order to produce three sequences of chunks corresponding, respectively, to three profiles relating to different levels of quality: Quality A, Quality B and Quality C. The chunks are transmitted by selecting a quality profile on the basis of the bitrate available for transmission: three chunks of the quality profile Quality B are first of all transmitted in accordance with the available bitrate, followed by two chunks of the quality profile Quality A, and then four chunks of the quality profile Quality C, and then again three chunks of the quality profile Quality B.

In one or more embodiments, there may be provision to encode the chunks in accordance with a video coding standard, such as H.264/AVC, H265/HEVC or even MPEG-2. As explained above, the images of a video sequence to be encoded are considered sequentially and divided into blocks of pixels that are processed sequentially, for example starting at the top left and finishing at the bottom right. These blocks of pixels are predicted by utilizing the correlation that exists between the pixels, which correlation may be either spatial (in the same image) or temporal (in the previously coded images). This prediction makes it possible to calculate the lowest possible pixel residual that is then transmitted to the decoder after transformation and quantization, in order to limit the side of the binary stream at the output of the encoder.

It is possible to draw a distinction between various prediction modes depending on whether they use spatial and/or temporal correlation-based prediction:

In what is called the "intra" mode, a block of pixels of a current image is predicted based on previously coded adjacent pixels present in the current image. There are several possible prediction directions depending on the encoder that is used to predict an intra block. The encoder generates, at output, information relating to the pixel residual and to the corresponding intra direction, which is provided to the decoder.

In what is called the "inter" mode, a block of pixels of a current image is predicted using pixels from one or more previously coded images (other than the current image). The block may be predicted based on just one or on two images. It is therefore possible to use either a single motion vector (called L0 vector) or else two motion vectors (called L0 and L1 vectors) that point to potentially different images to predict a block in inter mode. The pixel residual and information relating to the motion vector or vectors are transmitted jointly to the decoder.

In what is called the "skip" mode, as in the case of the inter mode, a block of pixels is predicted using pixels from previously coded images (one or two L0 and L1 images). The first difference is that, for the skip mode, only the information about the vectors is transmitted, the pixel residual being zero. This means that the block chosen in another image will be copied exactly in order to obtain the current block. The second difference is that the vectors used for this mode are deduced by the decoder from among a list of possible vectors, called predictor vectors, thereby making it possible to transmit only the position of the predictor in a dictionary rather than transmitting its value.

Video compression schemes usually use the group of pictures (GOP) concept to define an order in which the images of a video chunk are arranged. A GOP is typically repeated periodically until the end of the encoding. It consists of various types of image:

Type I (Intra) images: this type of image uses only the intra prediction mode. It therefore characterizes an image independent of the other images, in that it is sufficient in itself to be decoded, Type P (Predictive) images: This type of image uses the 3 intra, inter and skip prediction modes. The temporal correlation-based prediction is performed using only past images that have been encoded.

Type B (Bidirectional) images: This type of prediction also uses the 3 intra, inter and skip prediction modes, but the temporal correlation-based prediction may use past images and/or future images, as long as these are previously encoded images.

There are two types of GOP: closed GOPs that are able to be decoded independently, and open GOPs that are more efficient in terms of compression but some images of which may not be decoded in the following GOP.

A fixed GOP is a GOP whose order is constant every N images, N being a predetermined number.

Using chunking means that the video encoder has to start the chunks with an intra image. In order words, the chunking is configured such that each determined chunk begins with an intra image. However, as illustrated in FIG. 2, intra images are expensive in terms of encoding bitrate, such that a high number of intra images reduces the coding efficiency of a video chunk.

Figure 2:
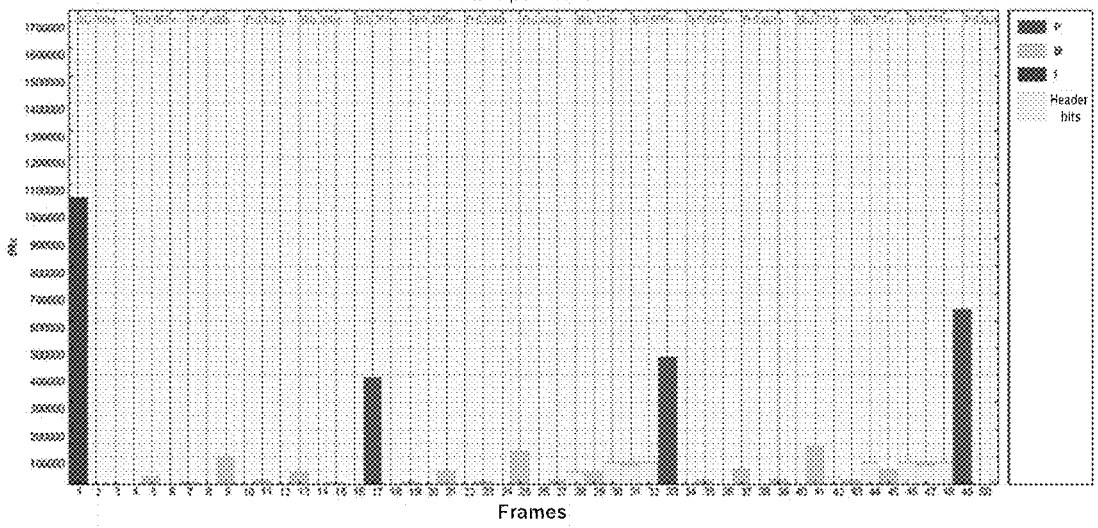
FIG. 2 illustrates the number of bits required to encode images of a video chunk, on the basis of the encoding mode used for each image.

FIG. 2 illustrates the number of bits required to encode images of a video chunk, on the basis of the encoding mode used for each image. The first image of the set of fifty images illustrated in the figure, since it is of type I (intra), generates a binary stream at the output of the encoder that is almost twice as large as the images 17, 33 and 49, which are type P images. Type B images by comparison generate a far smaller binary stream.

Furthermore, upon a scene change in a GOP, a video encoder will use an intra image at the first image of the scene, since temporal prediction is not effective, thereby further increasing the number of intra images in the chunk.

The proposed method deals with these various drawbacks by introducing, in one or more embodiments, a dynamic chunking method using a decision scheme for positioning the intra images forming the starts of chunks in order to improve the video encoding (and in particular its efficiency in terms of encoding bitrate).

Figure 3A:
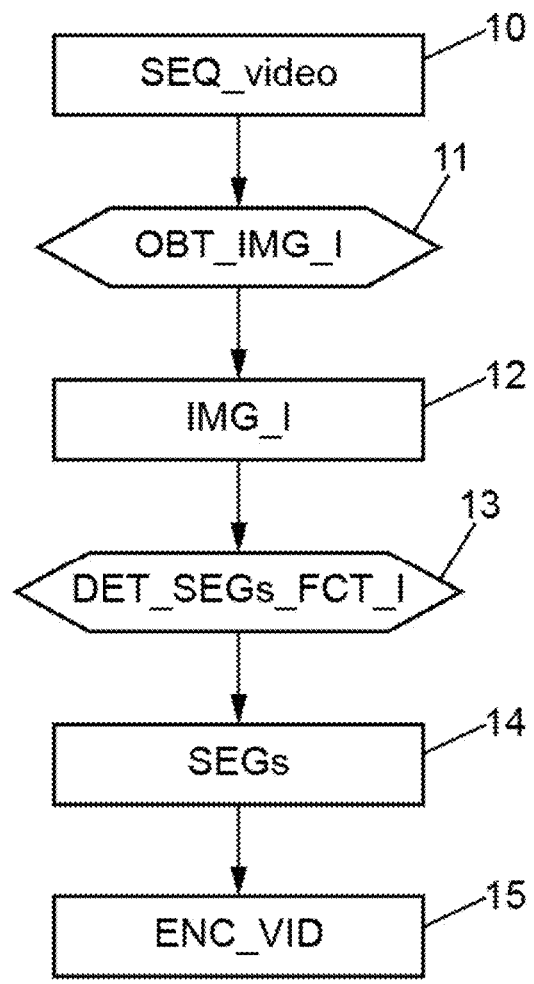
FIG. 3a illustrates the proposed method according to one or more embodiments.

FIG. 3a illustrates the proposed method according to one or more embodiments. This method may be implemented by any device comprising a processor and a memory, and configured so as to implement it, such as for example a video encoder or any equipment configured so as to encode a video sequence corresponding to multimedia content to be distributed for example in accordance with a multi-screen distribution protocol.

With reference to FIG. 3a, in one or more embodiments, the device configured so as to implement the method may be configured so as to obtain 11 information indicating, in a set of images of a video sequence 10, at least one image 12 to be encoded using a spatial correlation-based predictive coding mode.

The device may furthermore be configured so as to determine 13, in the set of images of the video sequence 10, consecutive subsets of images (chunks) 14, the respective sizes of at least some of the subsets of images being dependent on the at least one image 12 to be encoded using the spatial correlation-based predictive coding mode.

Thus, in one or more embodiments, the chunks may be determined for a video sequence starting from one or more images of the sequence that have been identified previously as "intra" images, that is to say images to be encoded using a spatial correlation-based predictive coding mode, such that the size of a chunk (expressed in terms of a number of images or, correspondingly, as a duration) may vary from one chunk to another, unlike chunking methods that impose a fixed chunk size.

For example, in one or more embodiments, the consecutive subsets of images may be determined such that their respective sizes are determined by the respective positions of "intra" images in the video sequence.

Advantageously, the device may be configured so as to encode the video sequence 15 on the basis of the determined consecutive subsets of images 14.

Thus, in one or more embodiments, what is proposed is a dynamic chunking method using variable chunk durations (or, correspondingly, sizes) in order to improve video encoding and thus reduce the bitrate of the encoded chunks for a given encoding quality, by taking advantage of information obtained or determined regarding images of the video sequence that are identified as having to be encoded using a spatial correlation-based predictive coding mode, and to do so independently of the transport protocol chosen to distribute the encoded chunks.

Figure 3B:
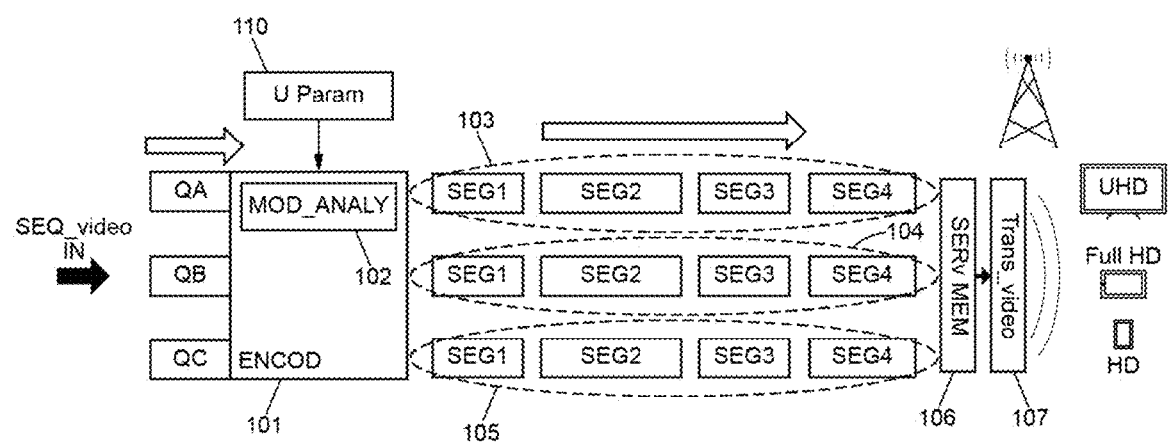
FIG. 3b illustrates an example of a network architecture containing a device configured so as to implement the proposed method according to one or more embodiments.

FIG. 3b illustrates an example of a network architecture for distributing video data, and containing a device 101 configured so as to implement the proposed method according to one or more embodiments.

With reference to FIG. 3b, three video sequences each containing a set of images corresponding to three different quality profiles QA; QB; QC of an input video sequence SEQ_video_IN are provided to the encoder ENCOD 101. These three profiles may differ in terms of the resolution of the images of the corresponding video sequence, which may differ from one profile to another. For example, the profile QA may correspond to a video sequence with a resolution of 2160p (3840×2160 pixels), the profile QB may correspond to a video sequence with a resolution of 1080p (1920×1080 pixels), and the profile QC may correspond to a video sequence with a resolution of 720p (1280×720 pixels). If the video sequence corresponds to a video stream distributed on a broadcast network in dynamic mode, a delay in the broadcasting of the profiles may be applied in order to give the encoder enough time to encode the chunks according to the various profiles. This delay may for example be of the order of a few seconds to a few tens of seconds. This delay may typically be utilized to analyse the set of images of a video sequence of a video stream currently being distributed, in order to determined therein the images to be encoded using an intra coding mode, for example because they correspond to a scene change or to a received chunk creation request.

In the embodiment illustrated in FIG. 3b, the device 101 comprises an analysis module MOD_ANALY 102 configured so as to analyse the images of one or more of the profiles QA; QB; QC on the basis of the input sequence SEQ_VIDEO IN, in order to determine one or more scene changes for all of the analysed profiles. On the basis of the analysis data generated by the analysis module MOD_ANALY 102, the profiles are each encoded using subsets of images (chunks) of variable sizes, 103, 104 and 105. Depending on the chosen embodiment, the size of each subset of images may be dependent on the determined scene changes and/or on external parameters provided to the encoder 101 by a user 110. The three profiles 103, 104 and 105 of the video sequences having different qualities/resolutions may make it possible to adapt to the hardware resources of the reading client, such as for example the available bandwidth or features of the viewing device (screen size, resolution, etc.).

In one or more embodiments, the chunking scheme (chunking) of a video sequence corresponding to a profile may be configured such that the position of the first image (of intra type) of each chunk of the video sequence corresponds to the respective positions of the first images of this same chunk in video sequences corresponding to other profiles. For example, with reference to FIG. 3b, the first image of the chunk SEG1 of the profile 103 may be chosen so as to match the first image of the chunk SEG1 of the profile 104 and that of the profile 105. In this way, the profile change following a variation in bandwidth may advantageously remain transparent to the user currently viewing the video sequence.

After encoding by the encoder ENCOD 101, the chunks of the various profiles are transmitted to the device 106 so as to be stored in one or more server memories. The chunks may then be transmitted by a transmission device 107 upon request from one or more clients (HD, Full HD, UHD) wishing to access multimedia content.

Figure 4A:
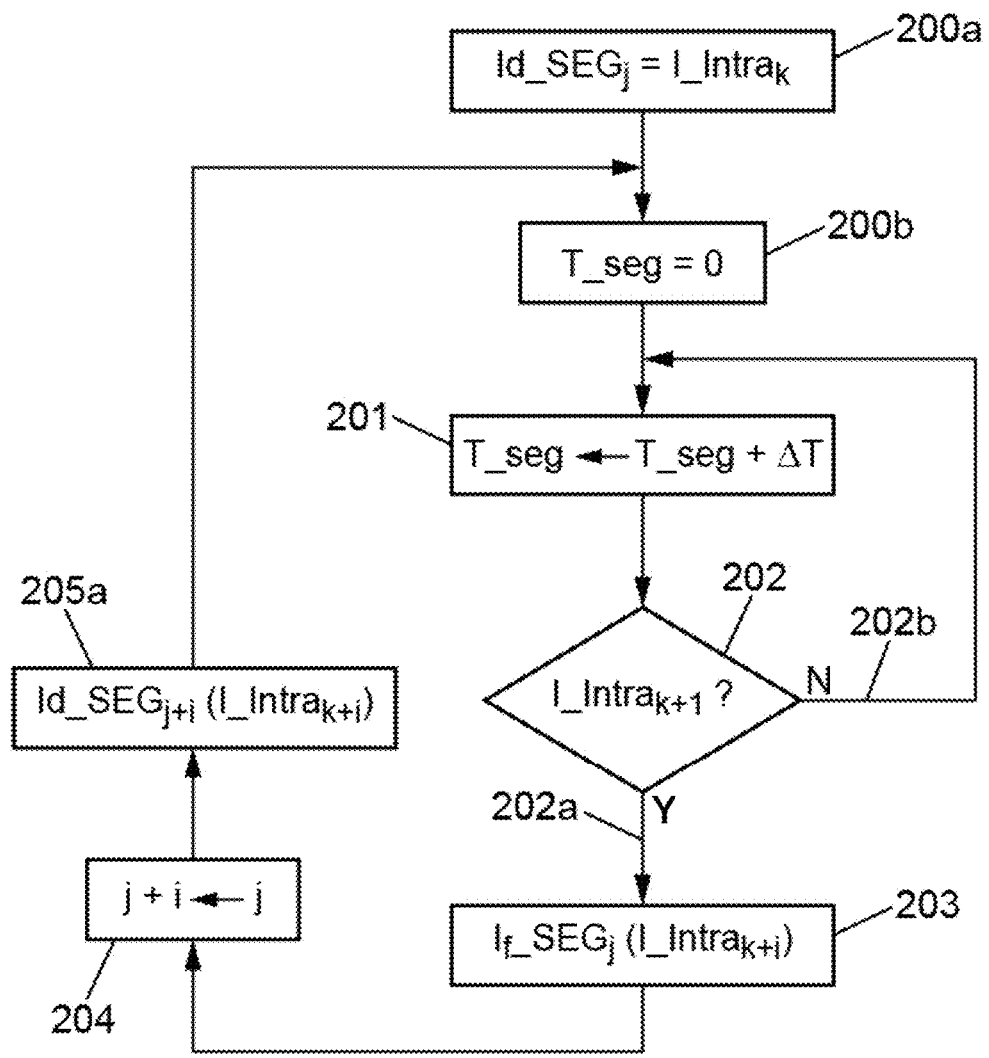
FIG. 4a illustrates an exemplary implementation of the proposed method according to one or more embodiments.

FIGS. 4a and 4b illustrate exemplary implementations of the proposed method according to one or more embodiments.

With reference to FIGS. 3b and 4a, in order to be able to define the start and the size (or, correspondingly, the starting image and the end image) of each chunk, a device (for example the encoder ENCOD 101) configured so as to implement one embodiment of the proposed method may be configured so as to determine, for example by way of an analysis module MOD_ANALY 102, parameters associated with images of a set of images of an input video sequence (for example the video sequence SEQ_video_IN), in order to select, from the set of images, at least one candidate image to define the start of a chunk. In one or more embodiments, the set of images of the input video sequence may be analysed in order to determine therein at least one image to be encoded using a spatial correlation-based predictive coding mode, for example in order to determine therein one or more images to be encoded using an intra coding mode. In one or more embodiments in which the encoder is configured so as to encode, using a spatial correlation-based predictive coding mode, the images corresponding to a scene change in the input video sequence and/or the images for which a chunk creation order has been received, the set of images of the input video sequence may be analysed in order to determine therein parameters relating to the respective content of the images in order to select the image or images corresponding to a scene change and/or in order to determine therein parameters relating to controlling the encoding of the images in order to select the image or images for which an external order has been received. In one or more embodiments, the set of images of the input video sequence may be analysed in order to determine therein parameters relating to the encoding of the images in order to select one or more images to be encoded using a spatial correlation-based predictive coding mode (for example an intra coding mode). Depending on the chosen embodiment, the analysis module will be configured so as to process the input video sequence (SEQ_video_IN), or each of the video sequences corresponding to the various quality profiles that are used (QA, QB, QC).

In one or more embodiments, the encoder may comprise an analysis module configured so as to determine one or more scene changes in the set of images of the input video sequence. In addition, external orders telling the encoder about the start of a new chunk may be integrated (for example by the user) into the input video sequence, such that the analysis of the input video sequence may furthermore comprise identifying external orders comprising one or more chunk creation requests.

One or more, or even, depending on the chosen embodiment, each determination of a scene change or of an external order may be taken into account by an decision to encode the corresponding image using a spatial correlation-based predictive coding mode. The encoding of this image using the spatial correlation-based predictive coding mode may be configured such that this image is of intra type. Thus, in the embodiments in which the encoder is configured so as to encode the images corresponding to a scene change using a spatial correlation-based predictive coding mode (for example using an intra mode), analysing the input video sequence in order to determine one or more images to be encoded using a spatial correlation-based predictive coding mode may comprise an analysis in order to determine, in a set of images of the sequence, one or more images corresponding to a scene change. Likewise, in the embodiments in which the encoder is configured so as to take into account the external chunk creation orders, the encoder may furthermore be configured so as to encode the images for which an external chunk creation order has been received using a spatial correlation-based predictive coding mode (for example using an intra mode). Analysing the input video sequence in order to determine a plurality of images to be encoded using a spatial correlation-based predictive coding mode may then furthermore comprise an analysis in order to select, in the set of images of the sequence, one or more images for which an external chunk creation order has been received.

With reference to FIG. 4a, an encoding device, comprising a processor operationally coupled to a memory, may be configured so as to analyse an input video sequence, the analysis comprising analysing the images of a set of images of the input sequence in order to determine the images to be encoded using a spatial correlation-based predictive coding mode (for example an intra coding mode), and generating a sequence of images to be encoded using a spatial correlation-based predictive coding mode $(I\_Intra_k)_k$, called sequence of candidate images, the sequence being ordered, for example on the basis of the rank (or of the position) of the images forming the input video sequence in said input video sequence. In the embodiments in which the encoder is configured so as to encode the images corresponding to a scene change and/or for which a chunk creation order has been received using a spatial correlation-based predictive coding mode (for example using an intra mode), analysing the images of the set of image of the input sequence in order to determine the images to be encoded using a spatial correlation-based predictive coding mode may comprise determining images corresponding to a scene change and/or selecting the images for which an order has been received, respectively, In one or more embodiments, two sequences of images may be generated by the encoder: a first sequence of images corresponding to a scene change (for example $(I\_SC_n)$ n=1, . . . , $N_{sc}$ if $N_{sc}$ images corresponding to a scene change have been determined in the set of images of the input video sequence), and a second sequence of images for which a chunk creation order has been received (for example $(I\_OE_m)$m=1, . . . , $N_{OE}$ if $N_{OE}$ images for which a chunk creation order has been received have been determined in the set of images of the input video sequence). These two sequences of images may be used to generate a sequence of candidate images $(I\_Intra_k)_k$ comprising images to be encoded using a spatial correlation-based predictive coding mode.

With reference to FIG. 4a, when the input video sequence is chunked, defining a new chunk $SEG_j$ of a sequence of chunks to be defined $(SEG_j)j$, for example iteratively (in a loop of index j as illustrated in the figure), may comprise determining (200a) the first image of this chunk, defined as being the starting image of the chunk Id_SEGj, in the sequence of candidate images $(I\_Intra_k)_k$. Thus, in one or more embodiments, one of the images of the sequence of candidate images $(I\_Intra_k)_k$ may be chosen as starting image of the chunk currently being defined SEGj.

For example, in the case of an external order parameterized by the user in the input video sequence, the first image of the newly defined chunk may be an intra image I_OEn corresponding to this external order (for example identified in the external order).

In one or more embodiments, the size of the chunk T_seg may furthermore be initialized (200b) to a value of predetermined size (for example zero or one) in order to be used as an index parameter of the loop for running through the video sequence. As discussed above, the size of the chunk T_seg may be expressed as a number of images or, preferably, as a duration.

In one or more embodiments, the images of the input video sequence that follow the first image of the chunk currently being defined Id_SEGj may then be run through, for example through successive iterations of a loop for running through the images of the input video sequence, one or more images of the sequence being analysed in each iteration of the run-through loop, in order to run through the set of images of the input video sequence in order to detect therein the next candidate image, that is to say an image of the sequence of candidate images $(I\_Intra_k)_k$ that is positioned, in the input video sequence, after the chunk starting image currently being defined (Id_SEGj) and immediately following, in the sequence of candidate images $(I\_Intra_k)_k$, the chunk starting image currently being defined (Id_SEGj). For example, this next image may correspond to the first intra image encountered by running through the input video sequence starting from the chunk starting image currently being defined (Id_SEGj). Running through the video sequence starting from the image Id_SEGj in an iterative loop may be performed for example by incrementing (201) the size (for example expressed as a duration or as a number of images) of the chunk T_seg by one increment $\Delta T$.

In the embodiments in which the size of a chunk is measured by determining a corresponding duration, the increment $\Delta T$ may correspond to the time step of an analysis/identification module in the set of images of the input video sequence. Advantageously, in one or more embodiments, it may be chosen to increment the counter for counting loops run through the video sequence (in the example illustrated in FIG. 4a, the counter T_seg) by a value corresponding to the duration of an image (obtained for example on the basis of an image frequency), so as to dynamically adapt this incrementation pitch upon a change of image frequency for the video stream.

In each iteration of the analysis loop, after each incrementation (201) of the size of the chunk T_seg, a check is performed (202) in order to determine whether the image reached when running through the video sequence starting from the image Id_SEGj corresponds to a candidate image (an image identified as having to be encoded using a spatial correlation-based predictive coding mode) belonging to the sequence of candidate images $(I\_Intra_k)_k$, for example to an image of the first sequence (I_SCn+1) or to an image of the second sequence (I_OEm+1). When the image (I_Intrak+1) reached by running through the video sequence is identified (202a) as belonging to the sequence of candidate images $(I\_Intra_k)_k$, the chunk currently being defined (SEGj) is defined (203), on the basis of its starting image (Id_SEGj), and of an end image (If_SEGj) determined on the basis of the image (I_Intrak+1), for example an end image (If_SEGj) determined as immediately preceding the image (I_Intrak+1) in the input video sequence. Once a chunk has been defined (SEGj in the example), a new iteration of the chunking loop may be implemented, for example by repeating the scheme described above in order to define the chunk previously being defined (SEGj) after incrementing (204) the chunking loop index j. In one or more embodiments, when the definition of a chunk SEGj for an iteration j of the chunking loop uses a candidate image (I_Intrak+1) of the sequence of candidate images (I_Intra$_k$)$_k$ identified in the iteration j, the first image (Id_SEGj+1) of the chunk (SEGj+1) following the chunk currently being defined (SEGj) is determined (205a) on the basis of this candidate image (I_Intrak+1) (for example as being this candidate image: Id_SEGj+1=I_Intrak+1), in order to implement the following iteration (j+1) of the chunking loop.

When the image reached by running through the video sequence is not identified (202b) as belonging to the sequence of candidate images (I_Intra$_k$)k, running through the input video sequence from the chunk starting image Id_SEG continues, for example by incrementing (201) the size parameter of the chunk (T_seg) as illustrated in the figure in order to test a new image of the input video sequence in the context of a new iteration of the loop for running through the input video.

As a variant, or in addition, in one or more embodiments, as described above, the images determined in the set of images of the input video sequence as having to be encoded using a spatial correlation-based predictive coding mode, for example the images determined in the set of images of the input video sequence as having to be encoded using an intra coding mode, may be organized, according to their respective ranks (or respective positions) in the video sequence, into an ordered sequence of images to be encoded using a spatial correlation-based predictive coding mode. This ordered sequence of images to be encoded using a spatial correlation-based predictive coding mode may then be run through in order to define the chunks of the input video sequence, depending on the embodiment of the chunking scheme that is chosen.

Thus, depending on the embodiment that is chosen, the input video sequence may be chunked by defining one or more chunks by determining, for a chunk currently being defined, a chunk starting image SEG$_j$ currently being defined and a starting image of the chunk SEGj+1 following the chunk SEGj currently being defined (chunk following the chunk currently being defined), by analysing the images of the sequence starting from the chunk starting image currently being defined, and/or by analysing an ordered sequence of images to be encoded using a spatial correlation-based predictive coding mode, the starting image of the following chunk corresponding to the image to be encoded using a spatial correlation-based predictive coding mode and that immediately follows the starting image of the chunk currently being defined in the ordered sequence of images to be encoded using a spatial correlation-based predictive coding mode.

FIG. 4b illustrates one embodiment of the proposed method corresponding to the scheme illustrated in FIG. 4a, in which a constraint Ci to be complied with in order to define the chunk currently being defined, such as for example a constraint on the size of the chunk currently being defined, is taken into account. Of course, the proposed method is not limited to a particular constraint, to a particular type of constraints, or to a number of constraints to be complied with in order to define one or more chunks during chunking.

As illustrated in FIG. 4a, the definition of a chunk (SEGj) may be initialized, in one or more embodiments, by determining (200a) a starting image of this chunk (Id_SEGj).

According to the embodiment, this starting image of the chunk currently being defined may be chosen, depending on the scenario, from among a sequence of candidate images corresponding to an ordered sequence of one or more images identified as having to be encoded using a spatial correlation-based predictive coding mode, or on the basis of another criterion provided by the embodiment. For example, as described in more detail below, in one or more embodiments, taking into account a maximum size criterion in order to define a chunk may lead to selecting the starting image of the following chunk, on the basis of which the end image of the chunk currently being defined may be determined, from among the images of the input video sequence not forming part of the sequence of candidate images, that is to say of the sequence of images identified as having to be encoded using a spatial correlation-based predictive coding mode.

With reference to FIG. 4b, in one or more embodiments, the size of the chunk T_seg may furthermore be initialized (200b) to a value of predetermined size (for example zero or one) in order to be used as an index parameter of the loop for running through the video sequence.

In one or more embodiments, the images of the input video sequence that follow the starting image of the chunk currently being defined (Id_SEGj) may then be run through, for example through successive iterations of a loop for running through the images of the input video sequence, in order to run through the set of images of the input video sequence in order to detect therein the next candidate image, that is to say an image of the sequence of candidate images (I_Intra$_k$)$_k$ that is positioned, in the input video sequence, after the chunk starting image currently being defined (Id_SEGj) and immediately following, in the sequence of candidate images (I_Intra$_k$)$_k$, the chunk starting image currently being defined (Id_SEGj). Running through the video sequence starting from the image Id_SEGj in an iterative loop may be performed for example by incrementing (201) the size (for example expressed as a duration or as a number of images) of the chunk T_seg by one increment ΔT. As indicated above, it may be preferable to increment a counter for counting a duration corresponding to an image of the video sequence in line with the current image frequency of the sequence.

In the embodiments in which the size of a chunk is measured by determining a corresponding duration, the increment ΔT may thus correspond to the time step of an analysis/identification module in the set of images of the input video sequence. In each iteration of the analysis loop, after each incrementation (201) of the size of the chunk T_seg, a check is performed (202) in order to determine whether the image reached when running through the video sequence starting from the image Id_SEGj corresponds to a candidate image (an image identified as having to be encoded using a spatial correlation-based predictive coding mode) belonging to the sequence of candidate images (I_Intra$_k$)$_k$. When the image reached by running through the video sequence is not identified (202b) as belonging to the sequence of candidate images (I_Intra$_k$)$_k$, running through the input video sequence continues, for example by incrementing (201) the size of the chunk (T_seg) as illustrated in the figure in order to test a new image of the input video sequence in the context of a new iteration of the loop for running through the input video.

When the image (I_Intrak+i) reached by running through the video sequence is identified (202a) as belonging to the sequence of candidate images (I_Intra$_k$)$_k$, the constraint Ci is taken into account for the identified image (I_Intrak+i), by checking (206) whether or not this image (I_Intrak+i) meets the constraint Ci.

When it is determined (206a) that the identified image (I_Intrak+1) meets the constraint Ci, the chunk currently being defined (SEGj) is defined (203), on the basis of its starting image (Id_SEGj), and of an end image (If_SEGj) determined on the basis of the candidate image (I_Intrak+1), for example an end image (If_SEGj) determined as immediately preceding the candidate image (I_Intrak+1) in the input video sequence. Once a chunk has been defined (SEGj in the example), a new iteration of the chunking loop may be implemented, for example by repeating the scheme described above in order to define the chunk previously being defined (SEGj) after incrementing (204) the chunking loop index j. In one or more embodiments, when the definition of a chunk SEGj for an iteration j of the chunking loop uses a candidate image (I_Intrak+1) of the sequence of candidate images $(I\_Intra_k)_k$ identified in the iteration j, the first image (Id_SEGj+1) of the chunk (SEGj+1) following the chunk currently being defined (SEGj) is determined (205b) on the basis of this candidate image (I_Intrak+1) (for example as being this candidate image: Id_SEGj+1=I_Intrak+i), in order to implement the following iteration (j+1) of the chunking loop.

When it is determined (206b) that the identified image (I_Intrak+1) does not satisfy the constraint Ci, various scenarios may be contemplated, depending on the constraint Ci.

In a first scenario (206b1), which may occur for example when a minimum size constraint is taken into account, running through the input video sequence from the chunk starting image Id_SEG continues, for example by incrementing (201) the size parameter of the chunk (T_seg) as illustrated in the figure in order to test a new image of the input video sequence in the context of a new iteration of the loop for running through the input video. The check (202) described above in order to determine whether the image reached when running through the video sequence starting from the image Id_SEGj corresponds to an image (I_Intrak+i+1) of the sequence of candidate images $(I\_Intra_k)_k$ may be performed again, and the check (206) in relation to the constraint Ci for this image may itself also possibly be performed again.

In a second scenario (206b2), which may occur for example when a maximum size constraint is taken into account, the end image of the chunk currently being defined is determined (203b), for example on the basis of a previously determined size of the chunk currently being defined. The chunk currently being defined (SEGj) is then defined on the basis of its starting image and of its end image. Once a chunk has been defined (SEGj in the example), a new iteration of the chunking loop may be implemented, for example by repeating the scheme described above in order to define the chunk previously being defined (SEGj) after incrementing (204) the chunking loop index j. In one or more embodiments, when the definition of a chunk SEGj for an iteration j of the chunking loop uses an image that is not a candidate image of the sequence of candidate images $(I\_Intra_k)_k$ identified in the iteration j, the first image (Id_SEGj+1) of the chunk (SEGj+1) following the chunk currently being defined (SEGj) is determined (205c) on the basis of the end image (If_SEGj) determined for the chunk currently being defined ($SEG_j$), in order to implement the following iteration (j+1) of the chunking loop.

In the embodiments using a maximum size constraint, the size constraint may be checked at the negative output (202b) of the test (202) in order to determine whether or not the image reached by running through the video sequence is a candidate image. It may thus be checked, if not, that the predefined maximum size of the chunks has not already been reached, in which case a predetermined size may be assigned to the chunk currently being defined.

Figure 5A:
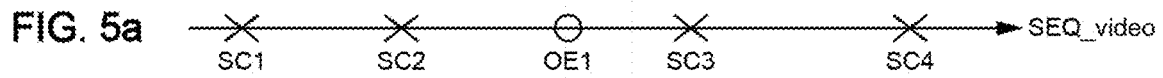
FIG. 5a illustrates an exemplary implementation of the proposed method according to one or more embodiments.
Figure 5B:
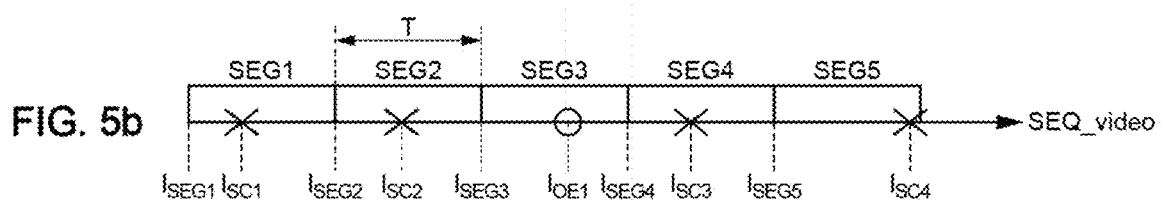
FIG. 5b illustrates an example of chunking a video sequence with fixed-size chunks.
Figure 5C:
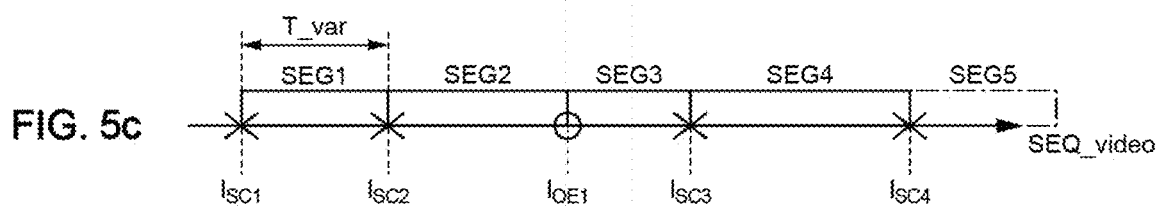
FIG. 5c illustrates an exemplary implementation of the proposed method according to one or more embodiments.

FIGS. 5a and 5c illustrate exemplary embodiments of the proposed method. FIG. 5a illustrates a video sequence SEQ_video, represented by a time axis, containing four scene changes (SC1; SC2; SC3; SC4) and an external order OE1. As explained above, images corresponding to scene changes of a video sequence are typically encoded using a spatial correlation-based predictive coding mode (for example an intra coding mode specified by a video encoding standard such as H.264, H.265, H.262, MPEG-2, AVC and HEVC) in order to obtain a better video encoding efficiency. For example, in one or more embodiments, the images of the input video sequence identified as corresponding to a scene change will be identified as having to be coded using an intra mode. In one embodiment, these images may be identified in the sequence as being of intra type.

FIG. 5b illustrates an example of a conventional chunking scheme for chunks of identical sizes T of the video sequence SEQ_video. The successive chunks SEG1; SEG2; SEG3; SEG4 and SEG5 are defined by a chunk start intra image ($I_{SEG1}$, $I_{SEG2}$, $I_{SEG3}$, $I_{SEG4}$ and $I_{SEG5}$) and a chunk end intra image, the end image of a chunk corresponding to the starting image of the following chunk. Since each image corresponding, in the video sequence SEQ_video, to a scene change (SC1; SC2; SC3; SC4) will preferably be encoded as being of intra type ($I_{SC1}$, $I_{SC2}$, $I_{SC3}$, $I_{SC4}$), and each image corresponding, in the video sequence SEQ_video, to an external order (OE1 will also be encoded as being of intra type ($I_{OE1}$), the total number of intra images in the input sequence SEQ_video illustrated in FIG. 5b will be equal to 10 ($I_{SEG1}$, $I_{SEG2}$, $I_{SEG3}$, $I_{SEG4}$ and $I_{SEG5}$, $I_{SC1}$, $I_{SC2}$, $I_{SC3}$, $I_{SC4}$ and $I_{OE1}$).

FIG. 5c illustrates an example of chunking (dividing into chunks) of the input video sequence SEQ_video according to one or more embodiments of the proposed method. As described above, images corresponding to scene changes of a video sequence will typically be encoded using a spatial correlation-based predictive coding mode, and may for example be identified as being of intra type in the sequence. The proposed method advantageously makes it possible to vary the size of the chunks T_var resulting from the chunking of a video sequence, by defining a chunk on the basis of two images to be encoded using a spatial correlation-based predictive coding mode (for example through two intra images), without imposing a single size on the chunks resulting from the chunking. For example, the first image to be encoded using a spatial correlation-based predictive coding mode may be chosen as starting image of a chunk currently being defined, and the second image to be encoded using a spatial correlation-based predictive coding mode may be chosen as starting image of the chunk immediately preceding or following, as the case may be, the chunk currently being defined. For example, the first image to be encoded using a spatial correlation-based predictive coding mode may be chosen as starting image of a chunk currently being defined, and the end image of the chunk currently being defined may be determined on the basis of the second image when this defines the start of the following chunk. In this case, the image of the video sequence immediately preceding the second image in the video sequence may be chosen as end image of the chunk currently being defined. In one or more embodiments, each of these two images may be identified as an image to be encoded using a spatial correlation-based predictive coding mode due to the fact that it corresponds to a scene change or to an external order, as described above.

With reference to FIGS. 5a and 5c, a first chunk (SEG1) may be defined on the basis of the images ($I_{SC1}$ et $I_{SC2}$) of the video sequence SEQ_video that are identified as corresponding, respectively, to the two first immediately consecutive scene changes (SC1 and SC2) in the video sequence. The starting image chosen for this first chunk may correspond to the image $I_{SC1}$, and the end image chosen for this first chunk may correspond to the image immediately preceding the image $I_{SC2}$ in the video sequence SEQ_video. A second chunk (SEG2) may be defined similarly on the basis of the images ($I_{SC2}$ and $I_{OE1}$) of the video sequence SEQ_video that are identified as corresponding, respectively, to the second scene change identified in the video sequence SEQ_video, and to the external order (OE1) received to encode an image of the sequence that is positioned, in the sequence SEQ_video, later than the image corresponding to the second change (SC2) and earlier than the image corresponding to the third scene change (SC3). A third chunk (SEG3) may be defined similarly on the basis of the images ($I_{OE1}$ and $I_{SC3}$) of the video sequence SEQ_video that are identified as corresponding, respectively, to the external order (OE1) received to encode an image of the sequence that is positioned, in the sequence SEQ_video, later than the image corresponding to the second change (SC2) and earlier than the image corresponding to the third scene change (SC3), and to the third scene change (SC3) identified in the video sequence SEQ_video. A fourth chunk (SEG4) may be defined similarly on the basis firstly of an image ($I_{SC4}$) of the video sequence SEQ_video that is identified as corresponding to the fourth scene change (SC4) and secondly an image of the video sequence SEQ_video that is positioned, in the sequence, later than the image ($I_{SC4}$) of the video sequence SEQ_video identified as corresponding to the fourth scene change (SC4) and identified as corresponding to the first scene change or to the first external order following the fourth scene change (SC4) in the video sequence SEQ_video. This last image of the fifth chunk, in one or more embodiments, may be identified by running through the video sequence SEQ_video starting from the image corresponding to the fourth scene change (SC4).

Thus, unlike conventional schemes in which images are able to be identified as having to be encoded using a spatial correlation-based predictive coding mode due to the fact that they were selected to be starting images of fixed-size chunks, the chunks of the video sequence SEQ_video, in one or more embodiments, may be defined on the basis of a sequence of images identified beforehand in the video sequence SEQ_video as having to be encoded using a spatial predictive coding mode. For example, in one or more embodiments, the chunks of the video sequence SEQ_video may be defined on the basis of a sequence of images identified in the video sequence SEQ_video as being of intra type. For example, in one or more embodiments, the chunks of the video sequence SEQ_video may be defined on the basis of a sequence of images identified in the video sequence SEQ_video as corresponding to a scene change or to an external order received to encode the images of the video sequence SEQ_video.

As illustrated by the example in FIG. 5c, chunking the sequence SEQ_video as proposed will lead to a reduction in the number of images in the chunked sequence to be encoded using a spatial correlation-based predictive coding mode (the number of intra images changing from 10 in the example of FIG. 5b to 5 in the example of FIG. 5c), which will thereby advantageously produce an improvement in the encoding efficiency of the video sequence that is thus chunked.

Figure 6A:
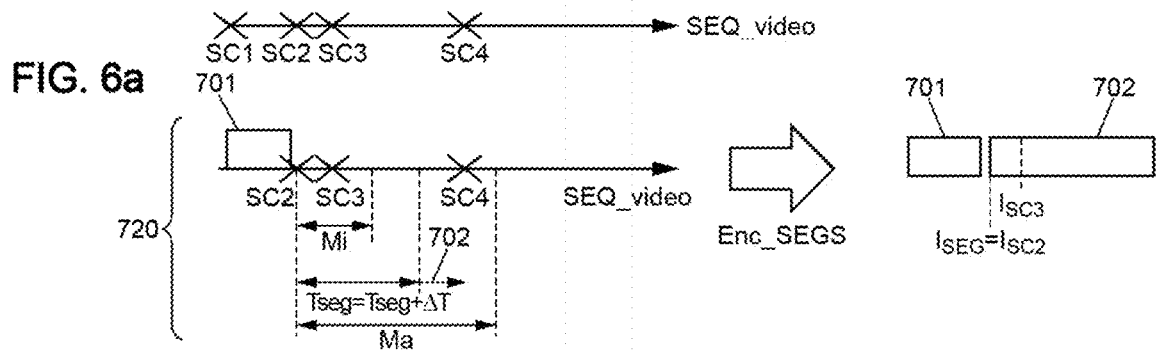
FIG. 6a illustrates a non-limiting exemplary implementation of the proposed method in which a chunk size constraint is used.
Figure 6B:
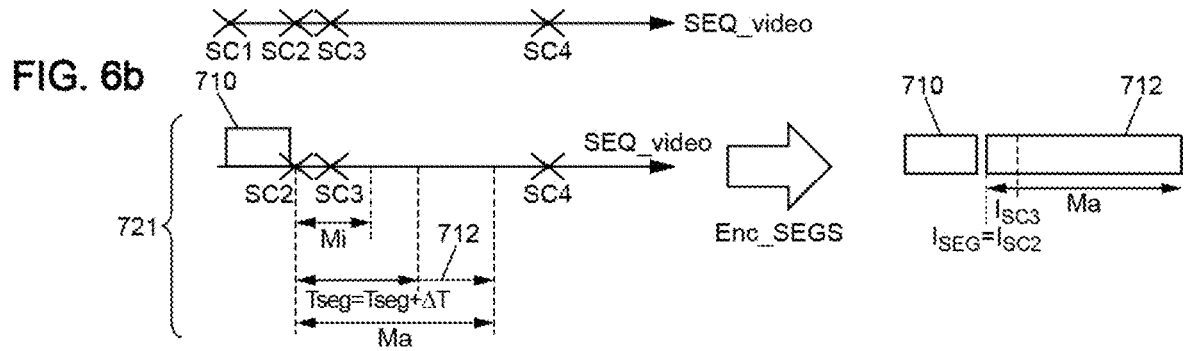
FIG. 6b illustrates a non-limiting exemplary implementation of the proposed method in which a chunk size constraint is used.

In one or more embodiments, determining consecutive chunks of variable sizes on the basis of a video sequence may take into account a minimum size or duration constraint of each chunk, and/or a maximum size or duration constraint of each chunk. FIGS. 6a and 6b illustrate a non-limiting exemplary implementation of the proposed method, in which a minimum chunk size constraint Mi and a maximum chunk size constraint Ma are used. A person skilled in the art may be aware that, although the example illustrated by FIGS. 6a and 6b contemplates using two size constraints (minimum size and maximum size), this example is not limiting, and the proposed method may be implemented, according to various embodiments, using no size constraint, or using one or more size constraints.

As illustrated in FIG. 6a, consideration is given to an exemplary video sequence SEQ_video that comprises four scene changes (SC1; SC2; SC3; SC4). The first scene change SC1 is processed using the method described above, thereby leading to the definition of a first chunk 701 for the video sequence SEQ_video, on the basis of the images of the sequence corresponding, respectively, to the two first consecutive scene changes (SC1, SC2) identified in the sequence. In one embodiment, the first image of the chunk 701 corresponds to the first scene change (SC1) and the last image of the chunk 701 corresponds to the image immediately preceding the image corresponding to the second scene change (SC2).

In one or more embodiments, determining the chunk following the previously defined chunk 701 may comprise determining the image corresponding to the second scene change SC2 as first image of the following chunk, and then incrementing a size parameter of the chunk in an iterative loop, starting from an initial value, in order to run through the video sequence SEQ_video in such a way as to determine the next image of the sequence to be encoded using a spatial correlation-based predictive coding mode, for example the next image determined as being of intra type because it corresponds to a scene change or to an external order. In the example illustrated, the image corresponding to the third scene change (SC3) is detected as being the first intra image following, in the video sequence, the image corresponding to the second scene change (SC2).

In the embodiments in which a minimum size or duration criterion is taken into account, this criterion may be applied by way of a first threshold value (Mi) corresponding to a minimum size or duration for each chunk. The distance ΔSC in the video sequence SEQ_video between the image corresponding to the third scene change (SC3) and the image chosen to be the first image of the chunk currently being defined (in the example illustrated the image corresponding to the second scene change (SC2)), expressed, depending on the embodiment, in a chosen unit of measurement (duration, number of images, amount of memory, etc.), may be compared with the first threshold value (Mi) (preferably expressed in the same unit of measurement) in order to determine whether it is greater than (or, depending on the embodiment, greater than or equal to) the first threshold value (Mi).

If the distance ΔSC in the video sequence SEQ_video between the image chosen to be the first image of the chunk currently being defined (in the example illustrated the image corresponding to the second scene change (SC2)) and the first image, from among the images following, in the video sequence, the image chosen to be the first image of the chunk currently being defined, identified as having to be encoded using a spatial correlation-based predictive coding mode, is less than the first threshold value (Mi) (in the example illustrated the image corresponding to the third scene change (SC3)), this image is not used in the determination of the chunk currently being defined. In one or more embodiments, running through the video sequence SEQ_video in order to identify the next image, from among the images following, in the video sequence, the image chosen to be the first image of the chunk currently being defined, continues. In the example illustrated in FIG. 6a, the image $I_{SC3}$ corresponding to the third scene change SC3 is not taken into account in the determination of the second chunk, and the video sequence SEQ_video is run through, starting from this image ($I_{SC3}$), for example until the image $I_{SC4}$ corresponding to the third scene change SC4 is identified. The check that the chunk thus constructed would have the minimum desired size (Mi) is performed again. If the minimum size constraint is not complied with, the process described above is repeated, and the video sequence is run through again in order to determine the next image, from among the images following, in the video sequence, the image chosen to be the first image of the chunk currently being defined. If the minimum size constraint is complied with, the determination of the chunk currently being defined continues, possibly with the application of other constraints (for example a maximum size constraint). In the example illustrated in FIG. 6a, the image $I_{SC4}$ corresponding to the fourth scene change SC4 is identified, and comparing the distance between the image $I_{SC4}$ corresponding to the fourth scene change SC4 and the image $I_{SC3}$ corresponding to the third scene change SC3 shows that this distance is greater than the minimum size threshold Mi, such that the image $I_{SC4}$ corresponding to the fourth scene change SC4 is selected as a candidate to define the image on the basis of which the last image of the chunk currently being defined may be determined, possibly before the application of other constraints.

Taking into account a minimum size criterion of the chunks advantageously makes it possible to avoid defining chunks, when chunking a video sequence, whose size is too small, to the detriment of the coding efficiency of the sequence when the video sequence contains images corresponding to successive scene changes that are close to one another in the video sequence.

A maximum size criterion may be taken into account in a manner similar to what is described above for a minimum size criterion: with reference to FIG. 6a, a maximum size criterion may be tested on each image determined, when running through the video sequence SEQ_video starting from the first image of the chunk currently being defined (702) (corresponding to the second scene change (SC2)), as being potentially able to be chosen to be the image on the basis of which the last image of the chunk currently being defined (702) is determined.

In the embodiments in which a maximum size or duration criterion is taken into account, this criterion may be applied by way of a second threshold value (Ma) corresponding to a maximum size or duration for each chunk. In one or more embodiments, the distance ΔSC in the video sequence SEQ_video between the candidate image to be the starting image of the following chunk, on the basis of which the last image of the chunk currently being defined (702) is determined, and the image chosen to be the first image of the chunk (702) currently being defined (in the example illustrated the image corresponding to the second scene change (SC2)), expressed, depending on the embodiment, in a chosen unit of measurement (duration, number of images, amount of memory, etc.), may be compared with the second threshold value (Ma) (preferably expressed in the same unit of measurement) in order to determine whether it is less than (or, depending on the embodiment, less than or equal to) the second threshold value (Ma).

If the distance ΔSC is less than the second threshold value (Ma), the determination of the chunk (702) continues, possibly with the application of other constraints. In the example illustrated in FIG. 6a, the image $I_{SC4}$ corresponding to the fourth scene change SC4 is identified, and comparing the distance between the image $I_{SC4}$ corresponding to the fourth scene change SC4 and the image $I_{SC2}$ corresponding to the second scene change SC2 shows that this distance is less than the minimum size threshold Ma, such that the image $I_{SC4}$ corresponding to the fourth scene change SC4 is selected as a candidate to define the first image of the chunk following the chunk currently being defined and on the basis of which the last image of the chunk currently being defined may be determined, possibly before the application of other constraints.

If the distance ΔSC is greater than the second threshold value (Ma), the chunk currently being defined is determined so as to have a predefined size (T). This scenario is illustrated in FIG. 6b, in which the distance between the image corresponding to the scene change SC4 and the image corresponding to the scene change SC2, chosen to be the first image of the chunk (712) currently being defined, once a first chunk (710) has been defined, is greater than the maximum size threshold Ma.

Thus, with reference to FIG. 6a, in one or more embodiments, the chunk 702 currently being configured may not be parameterized with a final chunk size T_seg (T). Specifically, the chunk size obtained after iteratively incrementing (for example by an increment ΔT) and detecting the scene change SC3, that is to say corresponding to the gap between the scenes SC3 and SC2, does not comply with the minimum chunk size constraint. The scene change SC3 is ignored, and the module resumes its analysis in order to determine the next scene change. During this new phase of detecting a scene change, the size of the current chunk T_seg is again incremented by the value ΔT. Upon detecting the scene change SC4, the value T_seg that is obtained, and corresponding to the gap between the scenes SC2 and SC4, is again compared with the previous duration constraints. For this new scene change SC4, the value T_seg that is obtained complies with the minimum and maximum chunk size constraints. Therefore, the chunk 702 is encoded (Enc_SEGS) with the intra image of the scene change SC2 $I_{SC2}$ as first chunk intra image $I_{SEG}$, and a chunk size T (T_seg) corresponding to the gap between the two scene changes SC2 and SC4. The new chunk 702 also contains the scene change SC3 ($I_{SC3}$).

FIG. 6b illustrates the case in which the scene change SC4 is located too far away in the video sequence to allow compliance with the maximum chunk size constraint Ma. Thus, as explained above, after having ignored the scene change SC3, the module 102 resumes its analysis in order to detect the next scene change. During the detection process, the size of T_seg of the chunk 712 during parameterization is incremented. During the incrementation, if the size of the chunk T_seg reaches the maximum chunk size constraint Ma, then the chunk 712 is encoded (Enc_SEGS) with the intra image of the scene change SC2 ($I_{SC2}$) as first chunk intra image $I_{SEG}$ and a predetermined chunk size T, for example equal to the maximum permitted chunk size value Ma. The new chunk 702 also contains the scene change SC3 ($I_{SC3}$).

According to one or more embodiments, it is possible to use only a minimum chunk size or duration constraint or only a maximum chunk size or duration constraint in order to parameterize and encode the chunks.

Furthermore, in one or more embodiments, priority levels may be defined and associated, respectively, with constraints in order to be used when defining one or more chunks for the chunking of a video sequence.

In one or more embodiments, the constraints used to chunk a video sequence might not be used to define at least some of the chunks resulting from the chunking. For example, defining the first chunk defined for a sequence and/or the last chunk defined for a sequence might not use one or more constraints that may be used when defining other chunks of the sequence.

In one or more embodiments, priorities may be defined for categories of images for using one or more constraints in order to define a chunk. For example, a first priority P1 may be assigned to the images corresponding to a scene change, and a second priority P2 may be assigned to the images corresponding to an external order. When defining a chunk, the priority associated with the type of an image contemplated as candidate image to define a chunk (first image of the chunk or last image of the chunk) may be taken into account in order to determine whether one or more constraints, for example size constraints, should be taken into account for this candidate image.

In one or more embodiments, if the priority associated with the type of candidate image Icand is lower than a priority associated with a constraint (P(Icand)<P(constraint)), the constraint may be applied to test the candidate image. By contrast, if the priority associated with the type of candidate image Icand is higher than the priority associated with a constraint (P(Icand)>P(constraint)), the constraint might not be applied and the candidate image might not be tested for this constraint. For example, the proposed method may be configured such that an external request (corresponding to an external order) is processed as a priority, that is to say for example without applying size constraints (minimum size and/or maximum size). The proposed method is thus able to produce chunks whose size does not correspond to size criteria used elsewhere, due to the fact that they are defined with images whose type corresponds to a priority level higher than that of the constraints (for example an image of a type corresponding to an external order).

In one or more embodiments, a maximum priority may be assigned to defining chunks on the basis of images for which a chunk creation request has been received by the video encoder. A chunk may thus be created on the basis of an image for which such an external order has been received, even though its size does not meet a minimum chunk size criterion and/or any other criterion, in particular a size criterion.

In one or more embodiments, the proposed method may comprise determining, in the set of images of the input video sequence, a plurality of reference images whose positions in the sequence are separated in pairs by a predetermined distance. This predetermined distance may advantageously correspond to an average desired duration for the image subsets (chunks) resulting from the chunking of the video sequence.

A chunk may then be defined by determining, in the set of images, a starting image of the chunk, and by determining a reference image positioned, in the video sequence, starting from the starting image of the chunk. A starting image of the chunk immediately following, in a string of consecutive chunks, the chunk currently being defined may then be determined, in the plurality of images to be encoded using a spatial correlation-based predictive coding mode, from among the images positioned in the video sequence around the reference image and at a distance less than a predetermined variation threshold. The end image of the chunk currently being defined may be determined on the basis of the starting image of the following chunk.

Figure 7:
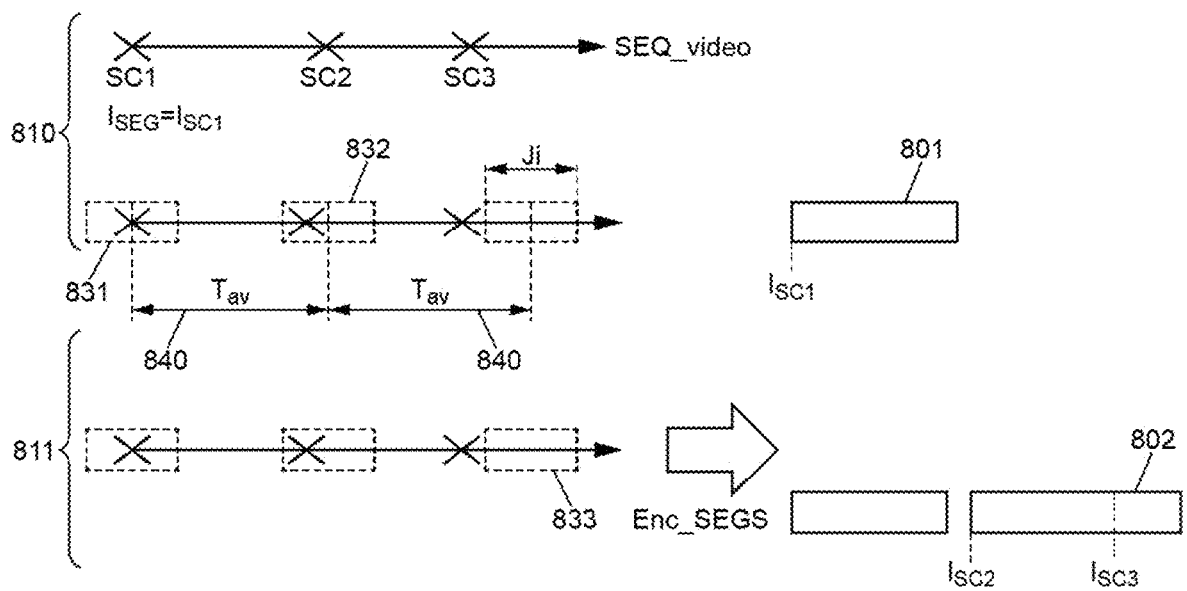
FIG. 7 illustrates an implementation of the proposed method according to one or more embodiments.

FIG. 7 illustrates the implementation of the proposed method according to one or more embodiments. These embodiments may be implemented separately or in combination with the other embodiments presented above.

In one or more embodiments, implementing the proposed method may use duration (or, equivalently, size) constraints that are defined on the basis of a predetermined duration or distance parameter, as the case may be, which may for example correspond to an average chunk duration ($T_{AV}$), and a predetermined variation threshold parameter, also called jitter below.

In one or more embodiments, the average duration ($T_{AV}$) may be chosen so as to define an average frequency at which the encoder should encode a new chunk. For example, a user may define an average period equal to two seconds, constricting the encoder to encode a new chunk every 2 seconds.

The average period parameter ($T_{AV}$) is then associated with a variation interval or, equivalently, with a variation threshold, which defines an interval around an image corresponding to the average period within which the encoder may be constrained to choose the starting image of the chunk currently being defined or the starting image of the chunk following the chunk currently being defined.

In one or more embodiments, the variation interval may define a duration range, and the encoder may be configured so as to look for and choose a scene change present in this interval in order to create a new chunk. For example, the user may associate an average period of 4 seconds with an interval of one second.

FIG. 7 illustrates an exemplary video sequence (SEQ_video) that contains three scene changes (SC1; SC2; SC3). According to one or more embodiments, in an encoding process, the first scene change (SC1) may be chosen so as to define the chunk starting image of the chunk currently being defined.

In one embodiment, the encoder may determine whether the scene change SC1 is contained within the interval (JI) 831 around a first reference image IR1. The images of the set of images of the video sequence (SEQ_video) may then be run through, for example by iterating a run-through loop as described above, starting from the chunk starting image.

The video sequence may continue to be run through until the next scene change (SC2) is detected. Upon detecting this scene change (SC2), it may be checked that this detected scene change is positioned within an interval (832) with a predetermined amplitude variation around the position of a second reference image IR2.

If this is the case, as illustrated in FIG. 7, the image corresponding to the second scene change (SC2) may be determined as being a chunk starting image of the chunk following the chunk currently being defined, and the end image of the chunk currently being defined may be determined on the basis of the image corresponding to the second scene change (SC2). The chunk currently being defined (801) is thus defined on the basis of a size corresponding to the gap between the two scene changes SC1 and SC2.

The process of chunking the video sequence may continue in order to determine a chunk end image of the chunk whose chunk starting image was previously determined as being the image corresponding to the second scene change (SC2). The video sequence SEQ_video may continue to be run through until the image corresponding to the third scene change (SC3) is detected. Upon detecting this third scene change (SC3), it may be checked that this detected scene change is positioned within an interval (833) with a predetermined amplitude variation (Ji) around the position of a third reference image IRi.

If this is not the case, as illustrated in FIG. 7, the image corresponding to the third scene change (SC3) might not be taken into account in order to determine the chunk starting image of the chunk following the chunk currently being defined. In one or more embodiments, the image following, in the video sequence, the image corresponding to the third scene change (SC3) and positioned within the interval (833) with a predetermined amplitude variation (Ji) around the third reference image IR3 may be determined as chunk starting image of the chunk following the chunk currently being defined, and the end image of the chunk currently being defined may be determined on the basis of this image. For example, the video sequence may continue to be run through until reaching the first image within the interval (833) with a predetermined amplitude variation (Ji) around the third reference image IR3. The end image of the chunk currently being defined may be determined on the basis of the image corresponding to this image positioned within the interval (833) with a predetermined amplitude variation (Ji) around the third reference image IR3.

In the scenario illustrated in FIG. 7, the chunk 802 that is thus defined contains, in addition to the intra image ($I_{SC2}$) of the scene change SC2, the intra image ($I_{SC3}$) of the scene change SC3.

In one or more embodiments, when two scene changes are present within an interval with an amplitude variation around a reference image, a selection, for example by way of a random draw, may choose one of the scene changes of the interval to start a new chunk.

In other embodiments, when two scene changes are present within an interval with an amplitude variation around a reference image, it is possible to analyse the images positioned in the sequence after these two scene changes, for example by virtue of a delay imposed on the stream being distributed live that has to be chunked and encoded. For example, in the case of an external order located after these two scene changes, the second scene change, located after the first one in time, may be determined as chunk starting image of the chunk following the chunk currently being defined.

As indicated above, according to one or more embodiments, in operations of defining a new chunk, any external order that is detected may be taken into account as a priority, even if this leads to non-compliance with average chunk duration constraints imposed by the user.

It is possible to use, in combination, various duration constraints to define a chunk according to one or more embodiments of the proposed method, such as for example a combination of a maximum size constraint, a minimum size constraint and/or a constraint based on an average chunk size or one or more fluctuation intervals at the bounds around this average size.

Embodiments of the proposed method thus make it possible to parameterize chunk sizes that maintain the overall encoding efficiency by prohibiting excessively large chunks, and that reduce the visual impact for the user by prohibiting excessively short chunks.

Figure 8:
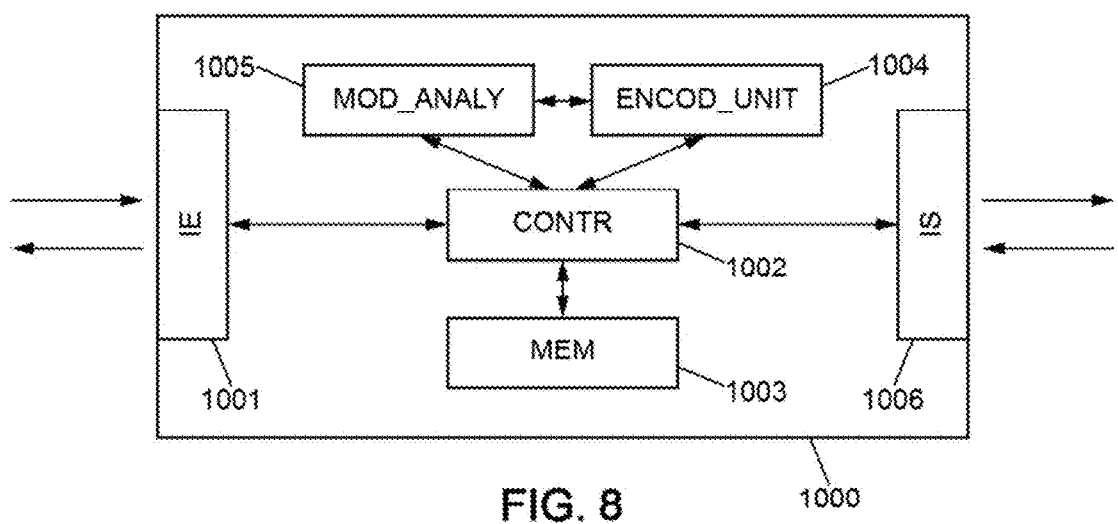
FIG. 8 illustrates an example of a device for encoding a video sequence for implementing the proposed method.

FIG. 8 illustrates an example of an architecture of a device for encoding a video sequence for implementing the proposed method.

With reference to FIG. 8, the device 1000 comprises a controller 1002, operationally coupled to an input interface 1001, to an output interface 1006 and to a memory 1003, which controls a video data (set of images) analysis module 1005 and an encoding unit 1004 for encoding subsets of images of a video sequence.

The input interface 1001 is configured so as to receive, at input, a set of images corresponding to a video sequence or a video stream being distributed live.

The controller 1002 is configured so as to control the video data analysis module 1005 and the encoding unit 1004 so as to implement one or more embodiments of the proposed method.

The video data analysis module 1005 may be configured so as to implement one or more embodiments of the proposed chunking method. It may in particular be configured so as to receive information indicating at least one image in the set of images to be encoded using a spatial correlation-based predictive coding mode and/or analyse a video sequence received on the input interface in order to determine information indicating at least one image in the set of image to be encoded using a spatial correlation-based predictive coding mode. The video data analysis module 1005 may furthermore be configured so as to determine, in the set of images of the video sequence, consecutive chunks of images, the respective sizes of at least some of the chunks being dependent on the at least one image to be encoded using the spatial correlation-based predictive coding mode.

The encoding unit 1004 may be configured so as to encode the defined chunks. Depending on the architecture that is chosen, the encoding unit 1004 may or may not comprise the video data analysis module.

The device 1000 may be a computer, a computer network, an electronic component or another apparatus containing a processor operationally coupled to a memory and, depending on the chosen embodiment, a data storage unit, and other associated hardware elements such as a network interface and a medium reader for reading a removable storage medium and writing to such a medium (these not being shown in the figure). The removable storage medium may be for example a compact disc (CD), a digital video disc (DVD), a flash disk, a USB key, etc. Depending on the embodiment, the memory, the data storage unit or the removable storage medium contains instructions that, when they are executed by the controller 1002, prompt this controller 1002 to perform or control the input interface part 1001, video data analysis module part 1005, image subset encoding and/or data processing from the exemplary implementations of the proposed method described in this document. The controller 1002 may be a component implementing a processor or a computing unit for encoding subsets of images of a video sequence according to the proposed method and controlling the units 1001, 1002, 1003, 1004, 1005, 1006 of the device 1000.

The device 1000 may furthermore be implemented in the form of software, as described above, or in the form of hardware, such as an application-specific integrated circuit (ASIC), or in the form of a combination of hardware and software elements, such as for example a software program intended to be loaded and executed on an FPGA (field-programmable gate array) component.

The method is not limited to the exemplary embodiments described above, only by way of example, but rather it encompasses all of the variants that a person skilled in the art might contemplate within the scope of the claims below.

INDUSTRIAL APPLICATION

Depending on the chosen embodiment, certain acts, actions, events or functions of each of the methods described in this document may be performed or take place in an order other than that in which they have been described, or may be added, merged or even not be performed or not take place, as the case may be. Furthermore, in some embodiments, certain acts, actions or events are performed or take place at the same time and not in succession.

Although they have been described through a certain number of detailed exemplary embodiments, the proposed control method and the device for implementing an embodiment of the method comprise various variants, modifications and refinements that will be obviously apparent to a person skilled in the art, it being understood that these various variants, modifications and refinements form part of the scope of the subject disclosure, as defined by the following claims. In addition, various aspects and features described above may be implemented together or separately or else substituted with one another, and all of the various combinations and sub-combinations of the aspects and features form part of the scope of the subject disclosure. Furthermore, it may be the case that some systems and equipment described above do not incorporate all of the modules and functions described for the preferred embodiments.

The invention claimed is:

1. A method implemented by computer means, for processing a video sequence comprising a set of images, the method comprising:
    obtaining information indicating at least one image in the set of images to be encoded using a spatial correlation-based predictive coding mode;
    determining consecutive subsets of images in the set of images;
    encoding the video sequence on the basis of the determined consecutive subsets of images;
    wherein the respective sizes, in number of images or in duration, of at least some of the subsets of images are dependent on the at least one image to be encoded using the spatial correlation-based predictive coding mode.

2. The method according to claim 1, wherein the at least one image to be encoded using a spatial correlation-based predictive coding mode corresponds to a scene change in the video sequence or to a sub-chunk creation request.

3. The method according to claim 1, wherein determining at least one subset uses a criterion relating to the size of the at least one subset.

4. The method according to claim 3, wherein the criterion is a minimum size criterion and/or a maximum size criterion.

5. The method according to claim 1, wherein determining at least one subset comprises:
    determining a starting image of the subset in the set of images;
    determining, from among the images positioned in the sequence starting from the starting image of the subset, a first candidate image in the plurality of images to be encoded using a spatial correlation-based predictive coding mode;
    determining a distance between the starting image of the subset and the first candidate image;
    comparing the distance with a threshold corresponding to a minimum size criterion or to a maximum size criterion;
    determining, in the set of images, an end image of the subset on the basis of the comparison with the threshold.

6. The method according to claim 5, comprising, when the threshold corresponds to a minimum size:
    when the distance is less than the threshold, determining, from among the images positioned in the sequence starting from the first candidate image, a second candidate image in the plurality of images to be encoded using a spatial correlation-based predictive coding mode;
    determining the subset using the second candidate image.

7. The method according to claim 5, comprising, when the threshold corresponds to a maximum size:
    when the distance is greater than the threshold, determining, from among the images positioned in the sequence starting from the starting image of the subset, an end image of the subset on the basis of a predetermined sub-chunk size.

8. The method according to claim 1, further comprising:
    determining, in the set of images, a plurality of reference images whose positions in the sequence are separated in pairs by a predetermined distance;
    determining, in the set of images, for at least one subset, a starting image of the subset;
    determining a reference image positioned in the sequence starting from the starting image of the subset;
    determining, in the plurality of images to be encoded using a spatial correlation-based predictive coding mode, from among the images positioned in the sequence around the reference image and at a distance less than a predetermined variation threshold, a starting image of the subset immediately following the subset in a string of consecutive subsets of images;
    determining, from among the images positioned in the sequence starting from the starting image of the subset, an end image of the subset on the basis of the starting image of the following subset.

9. A video sequence encoding device, comprising an input interface configured so as to receive a set of images of the video sequence; and an image encoding unit operationally coupled to the input interface and configured so as to process the video sequence using a method for processing a video sequence comprising a set of images, the method comprising:
    obtaining information indicating at least one image in the set images to be encoded using a spatial correlation-based predictive coding mode;
    determining consecutive subsets of images in the set of images;
    encoding the video sequence on the basis of the determined consecutive subsets of images;
    wherein the respective sizes, in number of images or in duration, of at least some of the subsets of images are dependent on the at least one image to be encoded using the spatial correlation-based predictive coding mode.

10. The encoding device according to claim 9, wherein the determining at least one subset uses a criterion relating to the size of the at least one subset.

11. The encoding device according to claim 10, wherein the criterion is a minimum size criterion and/or a maximum size criterion.

12. The encoding device according to claim 9, wherein determining at least one subset comprises:
- determining a starting image of the subset in the set of images;
- determining, from among the images positioned in the sequence starting from the starting image of the subset, a first candidate image in the plurality of images to be encoded using a spatial correlation-based predictive coding mode;
- determining a distance between the starting image of the subset and the first candidate image;
- comparing the distance with a threshold corresponding to a minimum size criterion or to a maximum size criterion;
- determining, in the set of images, an end image of the subset on the basis of the comparison with the threshold.

13. The encoding device according to claim 12, comprising, when the threshold corresponds to a minimum size:
- when the distance is less than the threshold, determining, from among the images positioned in the sequence starting from the first candidate image, a second candidate image in the plurality of images to be encoded using a spatial correlation-based predictive coding mode;
- determining the subset using the second candidate image.

14. The encoding device according to claim 12, comprising, when the threshold corresponds to a maximum size:
- when the distance is greater than the threshold, determining, from among the images positioned in the sequence starting from the starting image of the subset, an end image of the subset on the basis of a predetermined sub-chunk size.

15. A non-transitory computer-readable storage medium for storing a program able to be executed by a computer, comprising a dataset representing one or more programs, said one or more programs comprising instructions for, when said one or more programs are executed by a computer comprising a processing unit operationally coupled to memory means and to an input/output interface module, causing the computer to perform a method for processing a video sequence comprising a set of images, the method comprising:
- obtaining information indicating at least one image in the set of images to be encoded using a spatial correlation-based predictive coding mode;
- determining consecutive subsets of images in the set of images;
- encoding the video sequence on the basis of the determined consecutive subsets of images;
- wherein the respective sizes, in number of images or in duration, of at least some of the subsets of images are dependent on the at least one image to be encoded using the spatial correlation-based predictive coding mode.

16. The non-transitory computer-readable storage medium according to claim 15, wherein determining at least one subset uses a criterion relating to the size of the at least one subset.

17. The non-transitory computer-readable storage medium according to claim 16, wherein the criterion is a minimum size criterion and/or a maximum size criterion.

18. The non-transitory computer-readable storage medium according to claim 15, wherein determining at least one subset comprises:
- determining a starting image of the subset in the set of images;
- determining, from among the images positioned in the sequence starting from the starting image of the subset, a first candidate image in the plurality of images to be encoded using a spatial correlation-based predictive coding mode;
- determining a distance between the starting image of the subset and the first candidate image;
- comparing the distance with a threshold corresponding to a minimum size criterion or to a maximum size criterion;
- determining, in the set of images, an end image of the subset on the basis of the comparison with the threshold.

19. The non-transitory computer-readable storage medium according to claim 18, comprising, when the threshold corresponds to a minimum size:
- when the distance is less than the threshold, determining, from among the images positioned in the sequence starting from the first candidate image, a second candidate image in the plurality of images to be encoded using a spatial correlation-based predictive coding mode;
- determining the subset using the second candidate image.

20. The non-transitory computer-readable storage medium according to claim 18, comprising, when the threshold corresponds to a maximum size:
- when the distance is greater than the threshold, determining, from among the images positioned in the sequence starting from the starting image of the subset, an end image of the subset on the basis of a predetermined sub-chunk size.

* * * * *